(12) United States Patent
Donnerdal et al.

(10) Patent No.: US 8,413,645 B2
(45) Date of Patent: *Apr. 9, 2013

(54) CUTTING OR SAWING MACHINE

(75) Inventors: Ove Donnerdal, Savedalen (SE); Hakan Pinzani, Gothenburg (SE); Mari Albinsson, Gothenburg (SE)

(73) Assignee: Husqvarna AB, Huskvarna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 11/909,602

(22) PCT Filed: Mar. 23, 2005

(86) PCT No.: PCT/SE2005/000421
§ 371 (c)(1),
(2), (4) Date: Nov. 4, 2008

(87) PCT Pub. No.: WO2006/101423
PCT Pub. Date: Sep. 28, 2006

(65) Prior Publication Data
US 2009/0199835 A1 Aug. 13, 2009

(51) Int. Cl.
*B28D 1/04* (2006.01)

(52) U.S. Cl. ...................... 125/13.01; 125/13.03; 125/14

(58) Field of Classification Search ............... 125/13.01, 125/13.03, 14; 83/877, 425.3, 864, 876, 83/878, 666, 673, 676; 30/503.5, 388; 144/237, 144/238, 222
See application file for complete search history.

(56) References Cited

U.S. PATENT DOCUMENTS
3,513,888 A * 5/1970 Welsh et al. ................... 30/390
3,583,106 A * 6/1971 Dobbertin ..................... 451/358
(Continued)

FOREIGN PATENT DOCUMENTS
| EP | 1252956 A1 | 10/2002 |
| SE | 517165 C2 | 4/2002 |
| WO | 01/23157 A2 | 4/2001 |

OTHER PUBLICATIONS

International Search Report; Oct. 6, 2005.

*Primary Examiner* — Maurina Rachuba
(74) *Attorney, Agent, or Firm* — Novak Druce Connolly Bove + Quigg LLP

(57) ABSTRACT

A cutting or sawing machine (1) comprising a machine body (3), at least one disc shaped, rotatable tool (16a, 16b), an elongated tool carrier (14) having the substantial shape of a flat bar having a front end and a rear end, two opposite broad sides and two opposite edge sides, said rear end being connected to the machine body. The tool carrier comprises at least two elongated side walls (24, 25), a first elongated side wall (24) on one broad side of the tool carrier, a second elongated side wall (25) on the opposite broad side, said first and second side walls being essentially parallel with each other, and the front part of either one of the side walls or of a possible central elongated member (25) between the first and second side walls is provided with a bearing hole (28a) intended to carry a bearing of sliding contact type or of rolling contact type, i.e. a rolling bearing, and the two side walls and the possible central member being connected to each other at a plurality of sites, and each side wall (24, 25) has a length adapted to essentially cover at least the gap between the machine body (3) and the perimeter of its associated disc shaped tool (16a, 16b), i.e. the tool located on the same side of the tool carrier, so that from each broad side the side wall (24, 25) and the associated disc shaped tool together cover the power transmission to increase safety and reliability.

43 Claims, 15 Drawing Sheets

U.S. PATENT DOCUMENTS

| | | | |
|---|---|---|---|
| 3,735,489 A * | 5/1973 | Zatorsky, Jr. | 30/390 |
| 3,893,240 A * | 7/1975 | Morner et al. | 30/390 |
| 4,646,607 A | 3/1987 | Johansson | |
| 4,717,205 A * | 1/1988 | Sasage | 299/39.3 |
| 4,809,438 A * | 3/1989 | Nagashima et al. | 30/390 |
| 5,887,579 A | 3/1999 | Eriksson et al. | |
| 6,874,400 B2 * | 4/2005 | Johansson | 83/877 |
| 7,059,947 B2 * | 6/2006 | Crover | 451/311 |
| 7,131,897 B2 * | 11/2006 | Crover | 451/311 |
| 7,137,877 B2 * | 11/2006 | Uhl et al. | 451/358 |
| 7,571,720 B2 * | 8/2009 | Donnerdal et al. | 125/13.01 |
| 2004/0033852 A1 * | 2/2004 | Taomo et al. | 474/101 |
| 2010/0299944 A1 * | 12/2010 | Hellberg | 30/390 |

\* cited by examiner

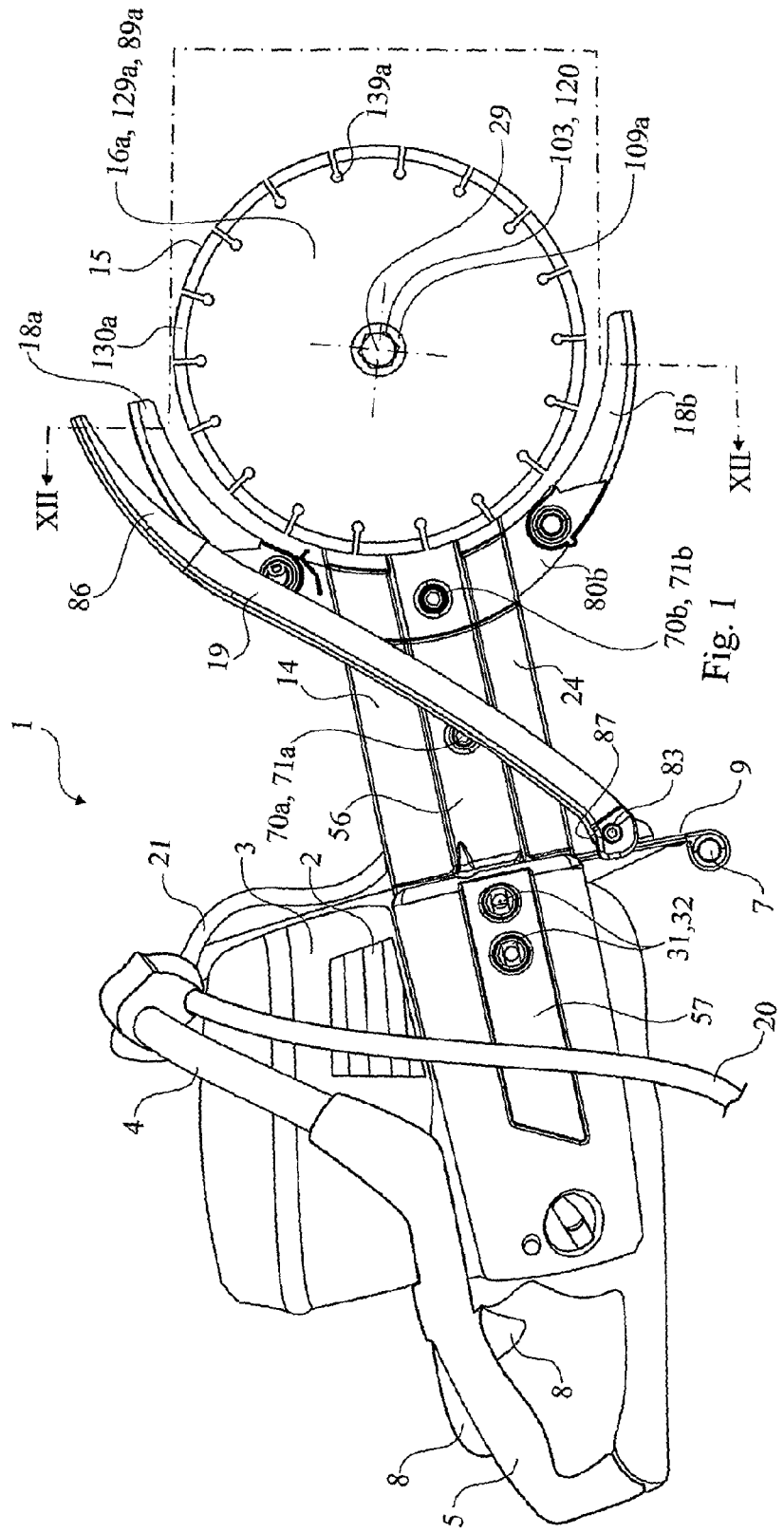

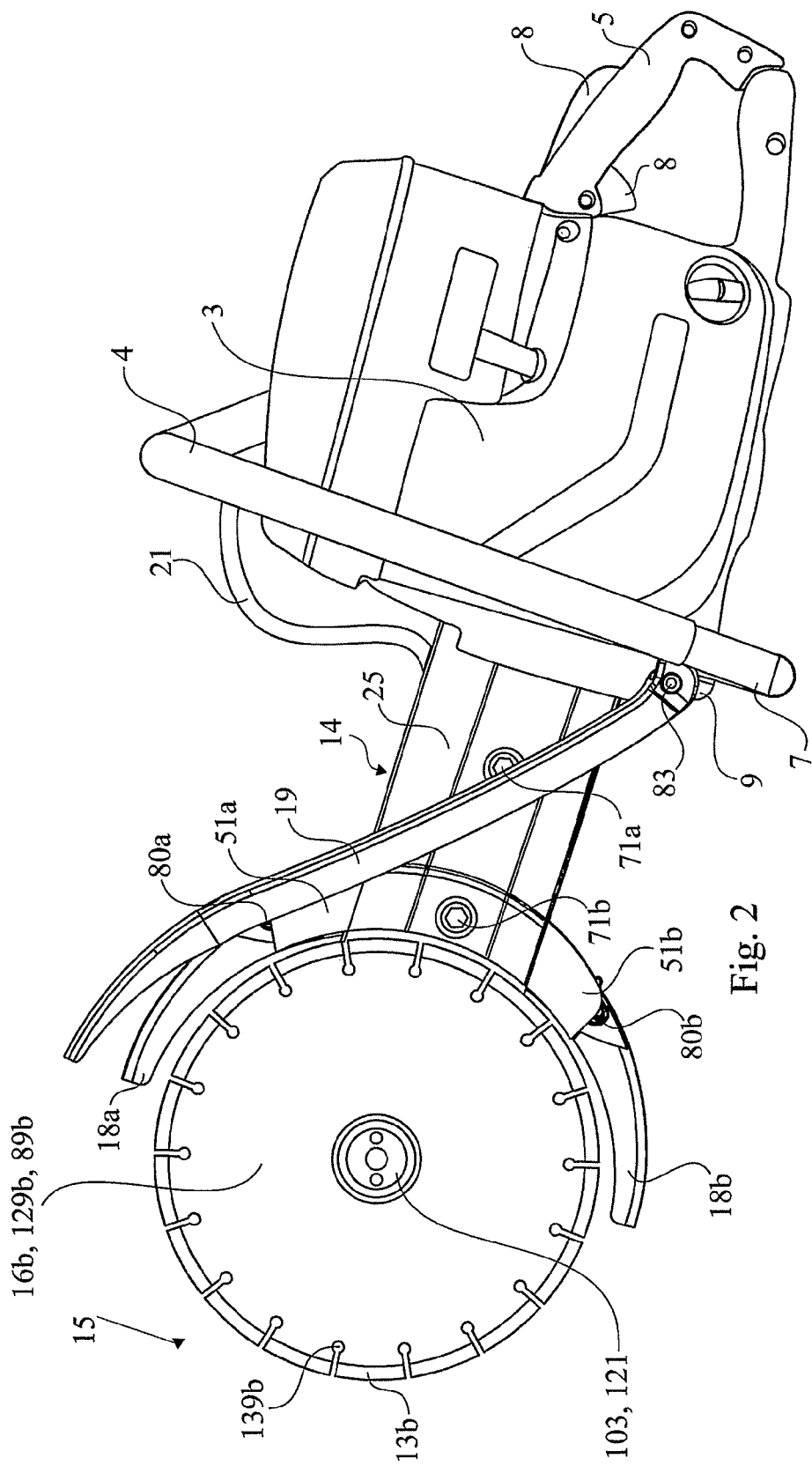

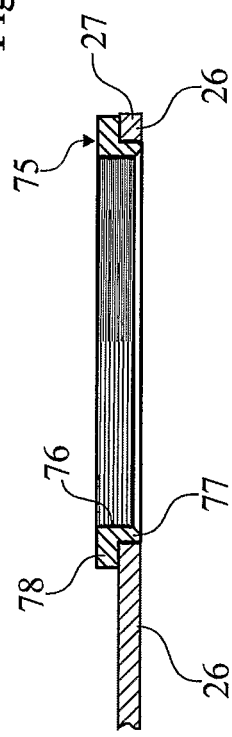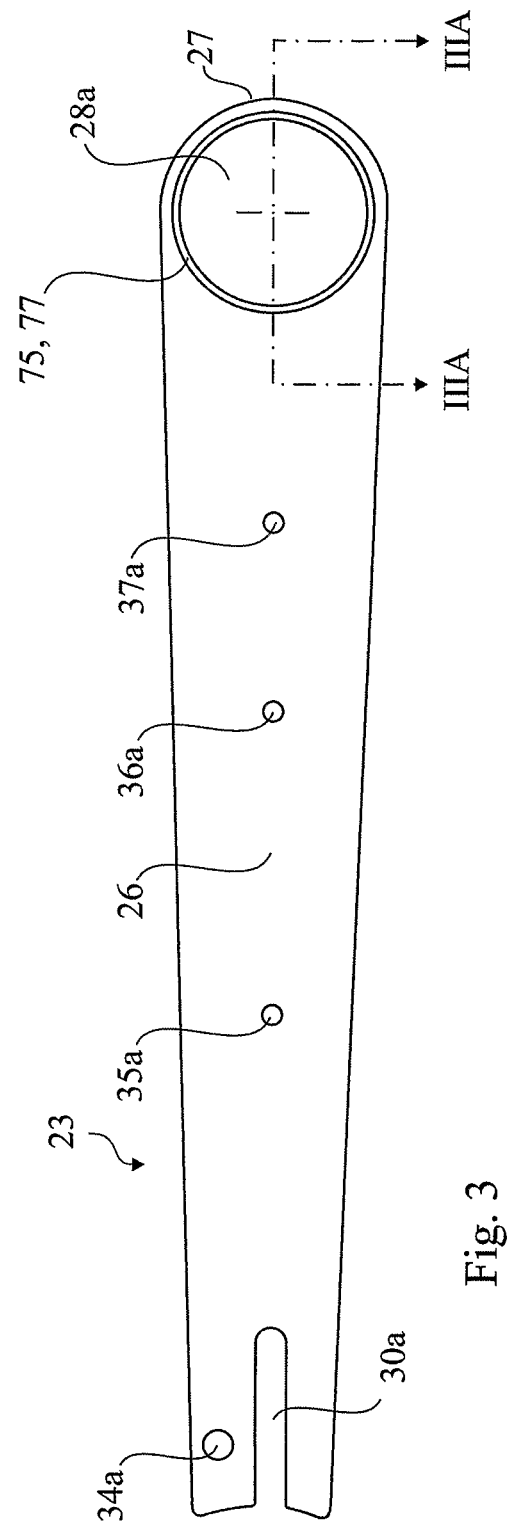

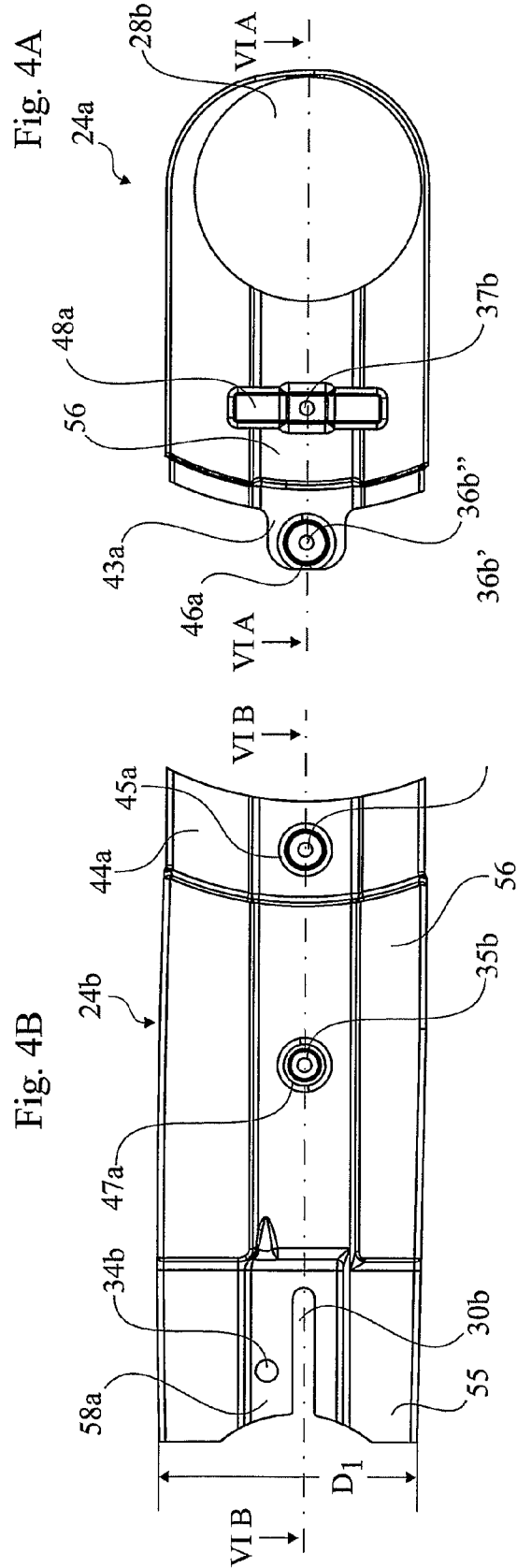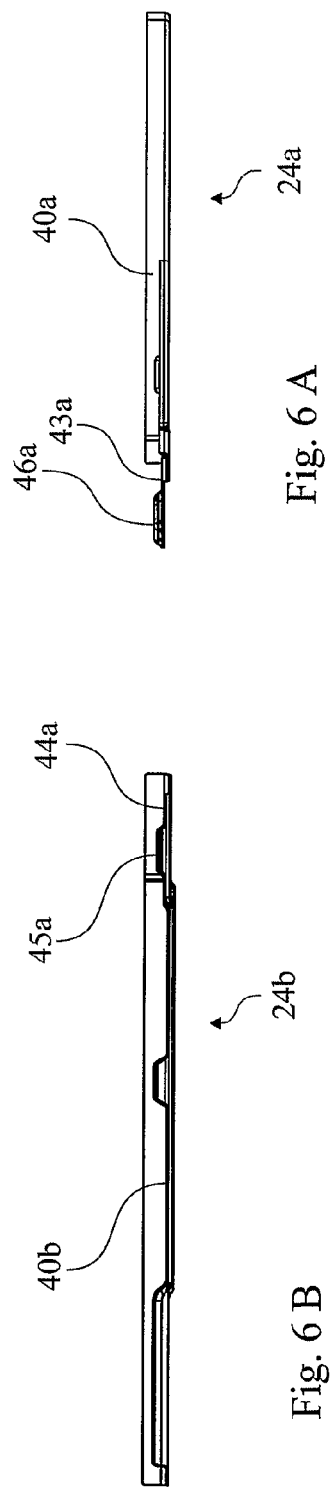

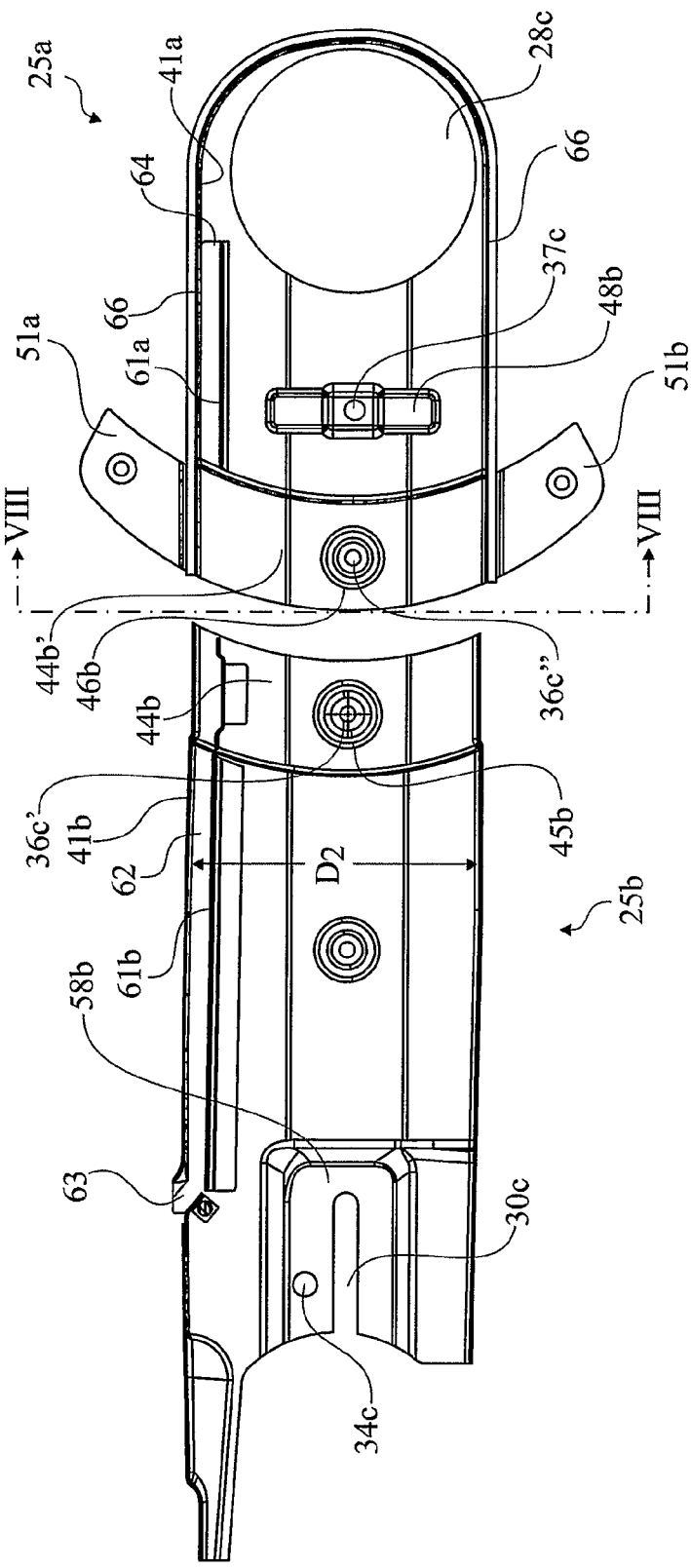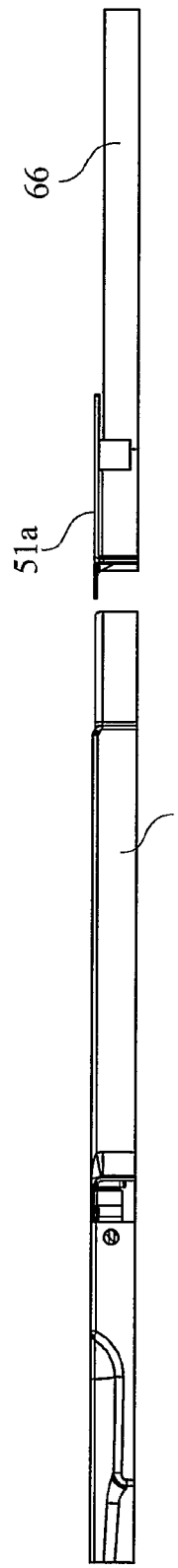

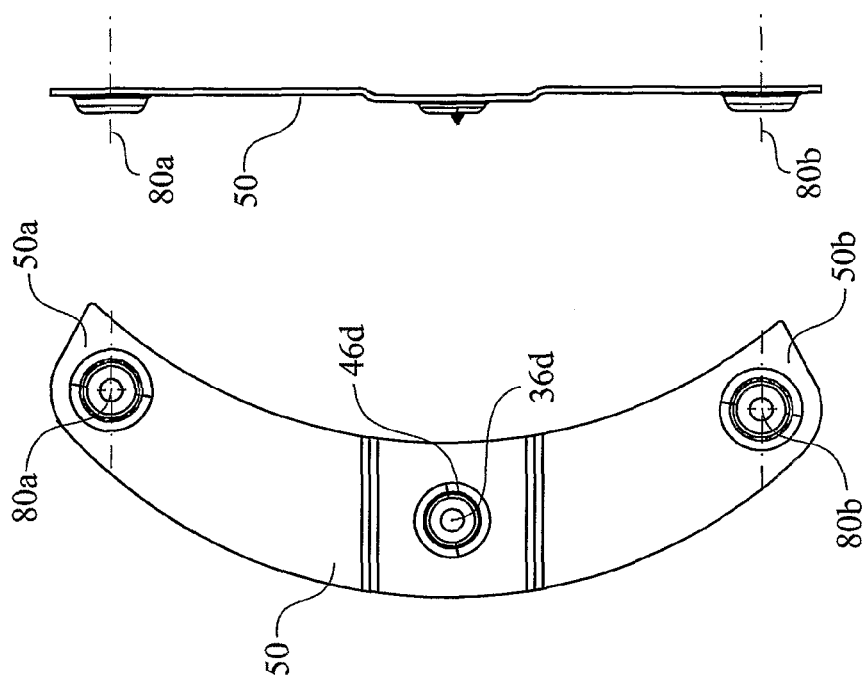
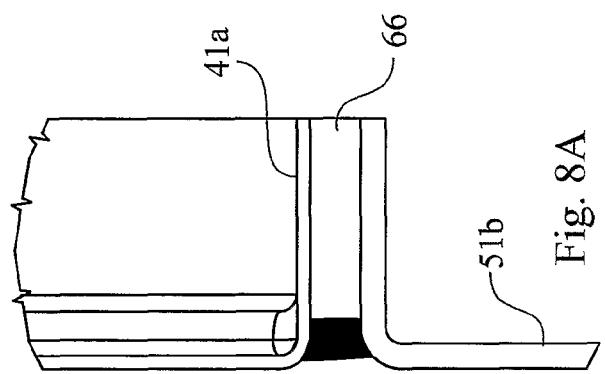
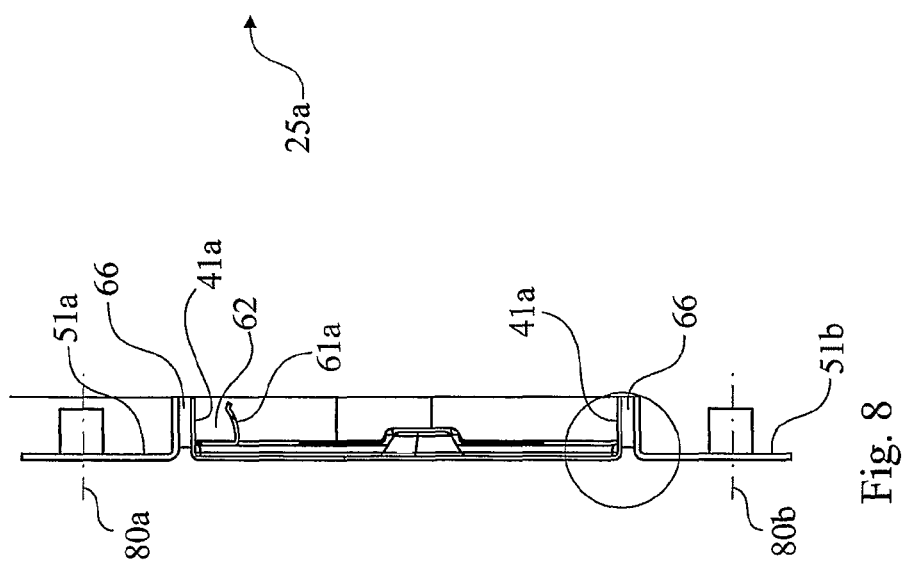

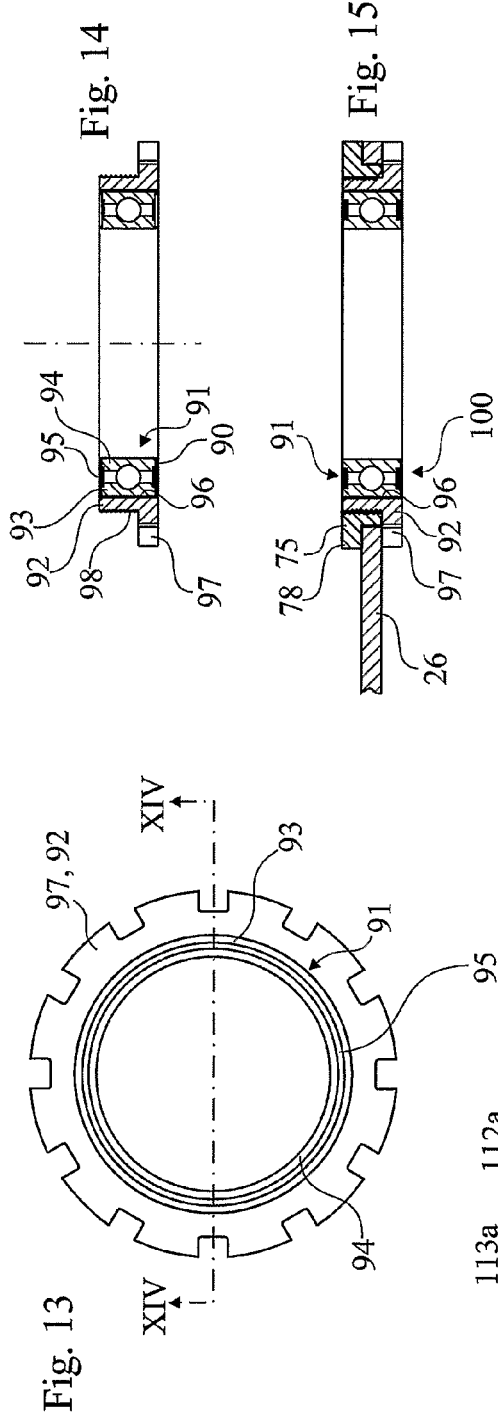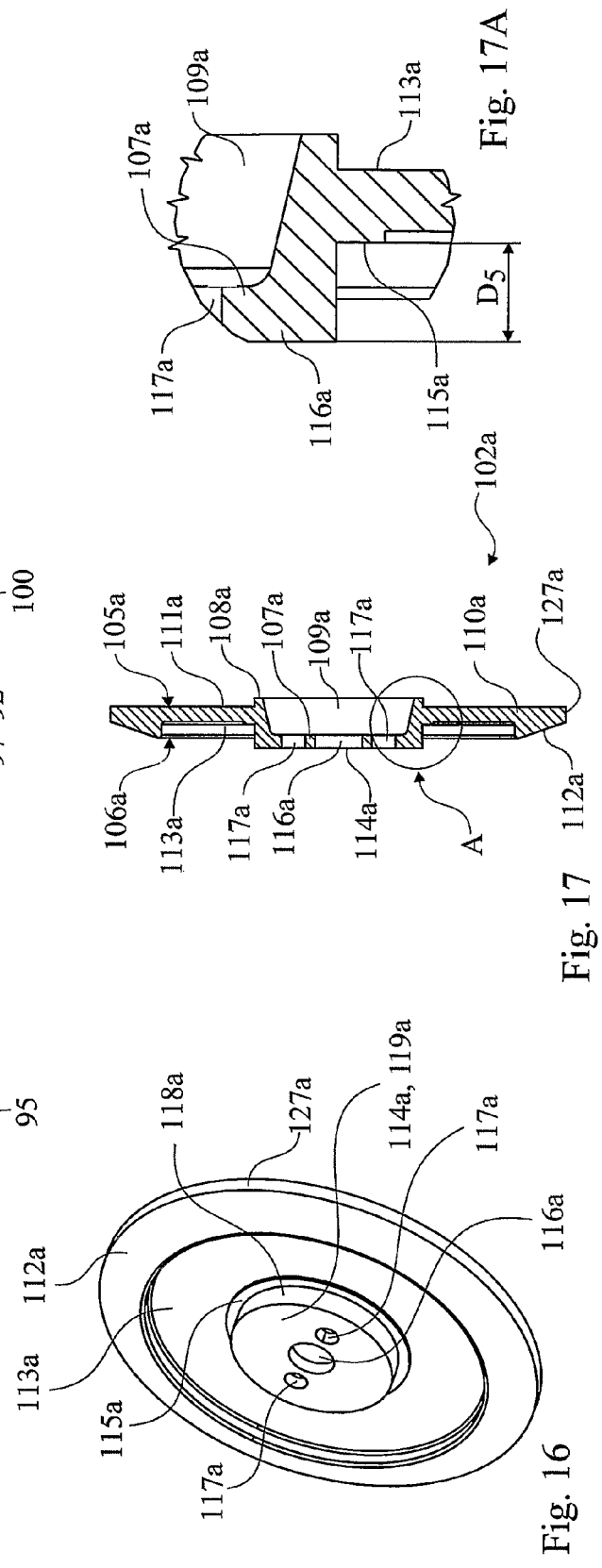

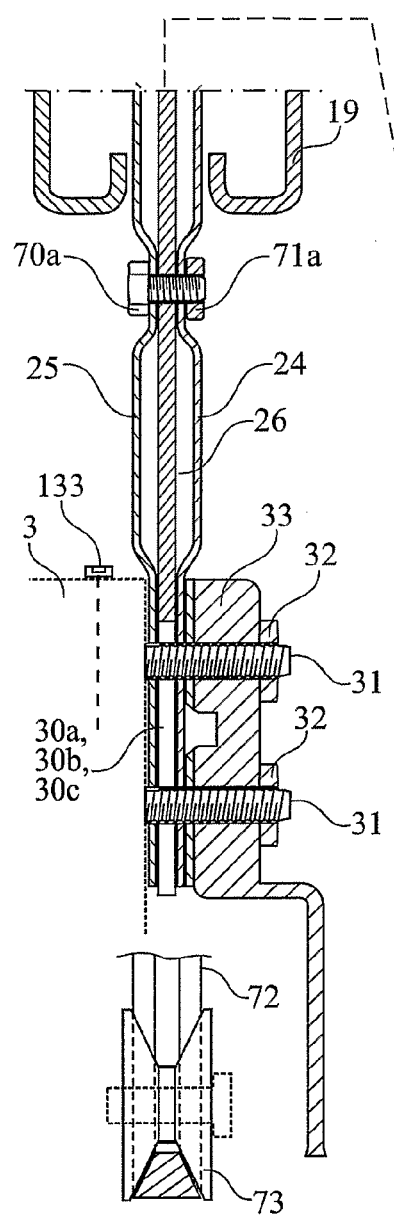
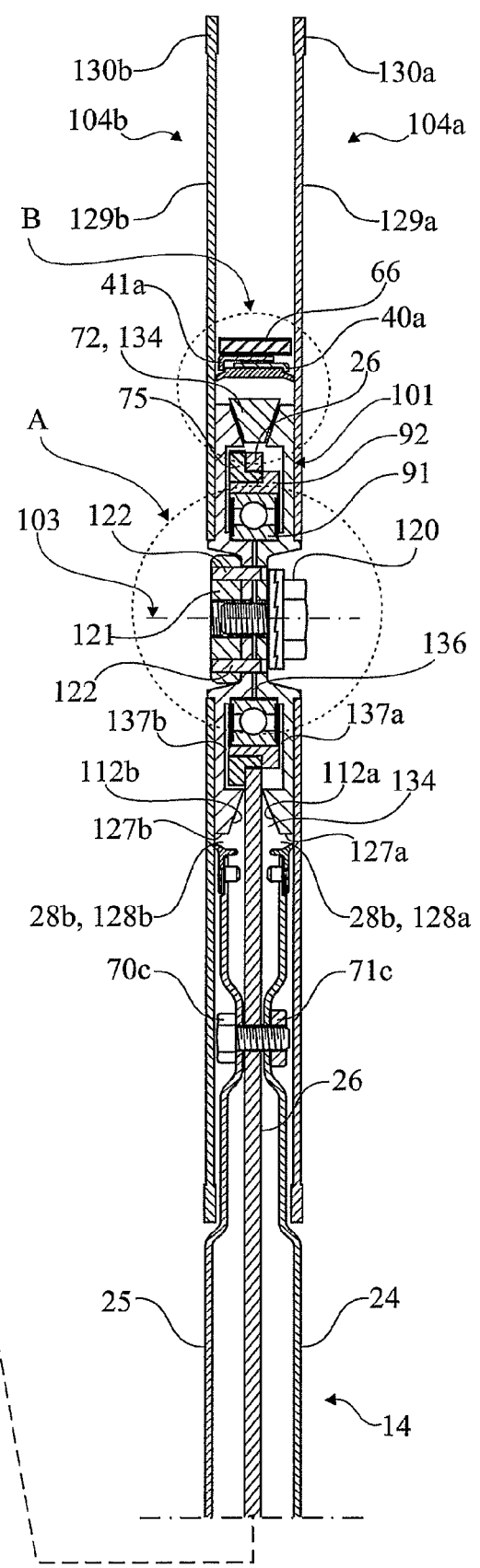
Fig. 22

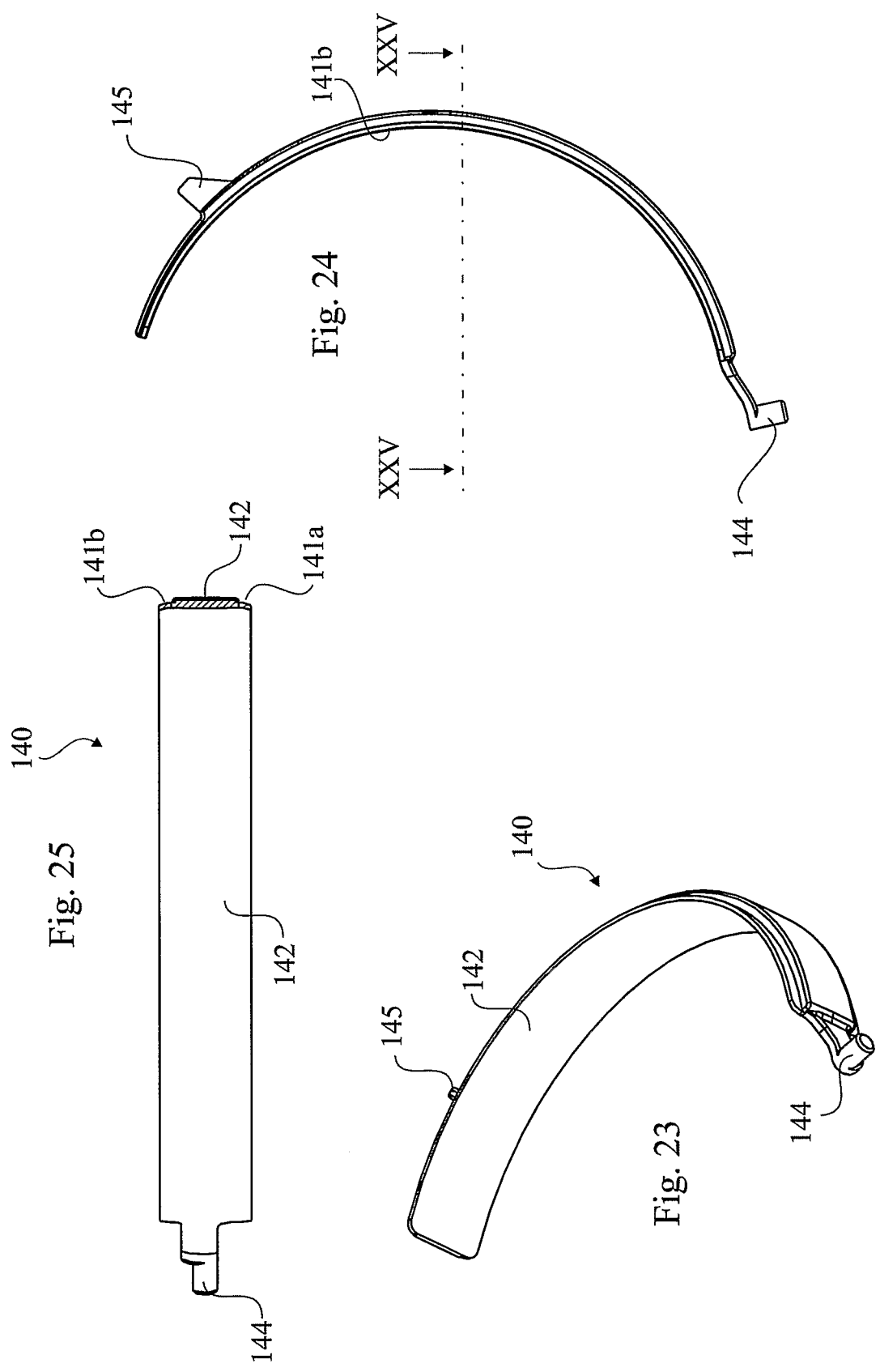

CUTTING OR SAWING MACHINE

TECHNICAL FIELD

The present invention relates to a cutting or sawing machine comprising a machine body, at least one disk shaped, rotatable tool, at least one rotatable driving member having an axis of rotation which is coaxial with the tool, an elongated tool carrier having the substantial shape of a flat bar having a front end and a rear end, two opposite broad sides and two opposite edge sides, and having a rear end which is connected to the machine body and a front end in which said at least one tool is rotatably mounted, and a power transmission for rotation of the tool via said driving member.

BACKGROUND OF THE INVENTION

U.S. Pat. No. 4,717,205 discloses a cutter in the form of a machine of the above defined type comprising a tool carrier consisting of a hollow arm and a driving member consisting of a sprocket accommodated inside of the hollow arm, in the front end thereof. On each side of the sprocket there is a bearing, each arranged in a bearing hole in a broad side of the hollow arm. Outside of each bearing there is a rotational tool. Because of this conventional bearing arrangement there is a considerable distance between the two rotational tools. This increases the distance between the two cuts which is a distinct disadvantage. Another shortage is that the machine is void of any kind of tool guard and nor is any solution of that safety issue suggested in the disclosure of the said US patent.

EP-1,252,956-A1 also discloses a machine of the type defined in the preamble. In this machine, the tool carrier consists of a solid bar of sufficient width for the provision of a desired bending resistance to the tool carrier and also for allowing the provision of a single bearing of desired width in the front end of the bar. The latter is an important technical achievement, making it possible to reduce the distance between the two rotational tools, i.e. the two cuts. On the other hand, the design disclosed in EP-1,252,956-A1 requires machining of the front section of the bar, which involves considerable costs, which is a drawback. Besides, a thick, solid bar is rather heavy which also is a drawback when the machine is a portable working machine. Nor does the bar provide any efficient protection of the power transmission and does not promote a good solution of problems concerning the blade guard issue. In particular there is a fixedly mounted double-walled side guard, but this guard does not protect the sides of the belt transmission. Therefore concrete parts or even loose wall cables could reach the inside of the belt and the belt pulleys. This is detrimental to the reliability of the machine and could possibly even be a safety hazard.

BRIEF DISCLOSURE OF THE INVENTION

It is the purpose of the present invention to provide a machine of the type defined in the preamble, which is improved over prior art. To this end, according to a first improvement of the machine, the tool carrier comprises at least two elongated side walls, a first elongated side wall on one broad side of the tool carrier, a second elongated side wall on the opposite broad side, said first and second side walls being essentially parallel with each other, and the front part of either one of the side walls or of a possible central elongated member between the first and second side walls is provided with a bearing hole intended to carry a bearing of sliding contact type or of rolling contact type, i.e. a rolling bearing, and the two side walls and the possible central member being connected to each other at a plurality of sites, and each side wall has a length adapted to essentially cover at least the gap between the machine body and the perimeter of its associated disc shaped tool, i.e. the tool located on the same side of the tool carrier, sp that from each broad side the side wall and the associated disc shaped tool together cover the power transmission to increase safety and reliability. A sealing may be provided in each of said second and third major holes, at least partly sealing a gap between each of the side walls of the tool carrier and the respective adjacent rotatable cutting tool, and the first improvement of the machine also includes a sealing element per se, which is provided for sealing at least partly said gaps.

A second improvement of the invention relates to the blade guard system of a cutting or sawing machine of the type which comprises a machine body including a power source, a tool assembly including two disk shaped, rotational cutter blades, one on each side of an elongated tool carrier having a rear end which is connected to the machine body and a front end in which the cutter blades are rotationally mounted, and a power transmission for rotation of the cutter blades, the edge portions of which form the working parts of the cutter blades, said edge portions having first, inner sides which face one another, and second, outer sides which define planes which form the limits of the, in the axial directions, maximally projecting parts of the tool assembly as well as of at least a major part of the tool carrier, allowing the complete tool assembly and said at least major part of the tool carrier to be entered into a groove established in a working object after removal of material between the two parallel kerfs made by the two rotational cutter blades. According to the improvement, the machine is provided with at least one tool guard belonging to any of the following first and second types, wherein the first type blade guard is a blade guard which is mounted on the tool carrier, adjacent to the tool assembly and has a width, i.e. extension in the axial direction, which is smaller than the distance between said second, outer sides of the edge portions of the cutter blades and hence also smaller than the width of said groove, allowing the first type blade guard to be entered into said groove, and wherein the second type blade guard is a blade guard which is pivotally mounted to the tool carrier or the machine body via a hinge adjacent to the rear end of the tool carrier and has a width which is larger than said distance between said second, outer sides of the edge portions of the cutter blades, preventing the blade guard of said second blade guard type from entering said groove but allowing a tip portion of it to slide against the outer surface of the working object when the tool assembly has entered the working object to a certain depth, turning said second type blade guard rearwards in said hinge.

A third improvement relates to a bearing unit which is intended to be applied in a machine which may be designed as described above, but which also may have other fields of use. The bearing unit includes a sliding contact or preferably a rolling-contact, i.e. a rolling bearing, and holder in the form of a circular ring. The term "rolling bearing" throughout this text means an anti-friction bearing composed of rolling elements interposed between an outer and an inner ring and includes ball bearings, roller bearings, and needle-roller bearings. According to the improvement, the holder ring has a first end surface in a first end of the ring, a second end surface in the opposite end, and an inner side which is cylindrical and extends between said first and second end surfaces, a flange in said first end extending radially outwards, the plane of a first annular surface of the flange coinciding with the plane of said first end surface, an outer side section of the holder ring extending between said flange and said second end surface, said side section being cylindrical and threaded, and wherein the rolling bearing is secured in the holder ring with the outer bearing ring pressed against said inner side of the holder ring.

A fourth improvement relates to a screw and nut coupling, in which one of said coupling members has at least one protrusion on the side facing the other member, laterally displaced relative to the threaded part of the member, said protrusion extending in the axial direction towards the other member. Also this improvement is intended to be employed in the first place in the machine of the present type, but may optionally also have other fields of use. Other aspects and features of the cutting or sawing machine and its related improvements will be apparent from the following description of a preferred embodiment of the machine and from the appending dependent claims.

BRIEF DESCRIPTION OF THE DRAWINGS

In the following description of a preferred embodiment, reference will be made to the accompanying drawings, in which FIG. 1 is a perspective view from the right of a cutting or sawing machine (in the following referred to as cutter) according to a preferred embodiment of the invention, FIG. 2 is a perspective view of the cutter as viewed from the left, FIGS. 3, 3A, 4A, 4B, 5A and 5B show a number of main parts, which in combination form a tool carrier included in the cutter, wherein FIG. 3 is a side view of a central member including a flat plate inside the tool carrier and a bushing, FIG. 3A shows a front portion of the central member, including said bushing, along the line IIIA-IIIA of FIG. 3, FIGS. 4A and 4B are side views, showing the outside of a front member and of a rear member, respectively, of a dish-shaped cover on the right hand side of the tool carrier, FIGS. 5A and 5B show the inside of a front member and of a rear member, respectively, of a dish-shaped cover on the left hand side of the tool carrier, FIGS. 6A and 6B show the members of FIGS. 4A and 4B in cross-sections along the lines VIA-VIA and VIB-VIB, respectively, FIGS. 7A and 7B show the members of FIGS. 5A and 5B along the lines VIIA-VIIA and VIIB-VIIB, respectively, FIG. 8 shows the front member of the left hand side cover of the tool carrier in a view along the line VIII-VIII in FIG. 5A, FIG. 8A shows an encircled part of FIG. 8 at a larger scale, FIG. 9 is a side elevation of a bracket, FIG. 10 shows the bracket in a view along the line X-X in FIG. 9, FIG. 13 is a side view of a bearing unit, FIG. 14 shows the bearing unit in cross-section along the line XIV-XIV in FIG. 13.

FIG. 15 is a cross sectional view of a ball bearing assembly along the line XV-XV of FIG. 11, FIG. 16 is a perspective view of a driving member in the form of one half of a split belt pulley, FIG. 17 shows the driving member in an axial cross-section, FIG. 17A shows an encircled detail A of FIG. 17 at a larger scale, FIG. 22 shows, semi-schematically, a tool assembly, the belt pulley, the tool carrier, and a portion of a machine body in a vertical view, corresponding to a vertical plane of symmetry of the tool assembly, FIG. 23 is a perspective view of a sealing element, FIG. 24 is a side elevation of the sealing element, and FIG. 25 is a sectional view the sealing element along the line XXV-XXV in FIG. 24.

DETAILED DESCRIPTION OF PREFERRED EMBODIMENTS

Figure 11:
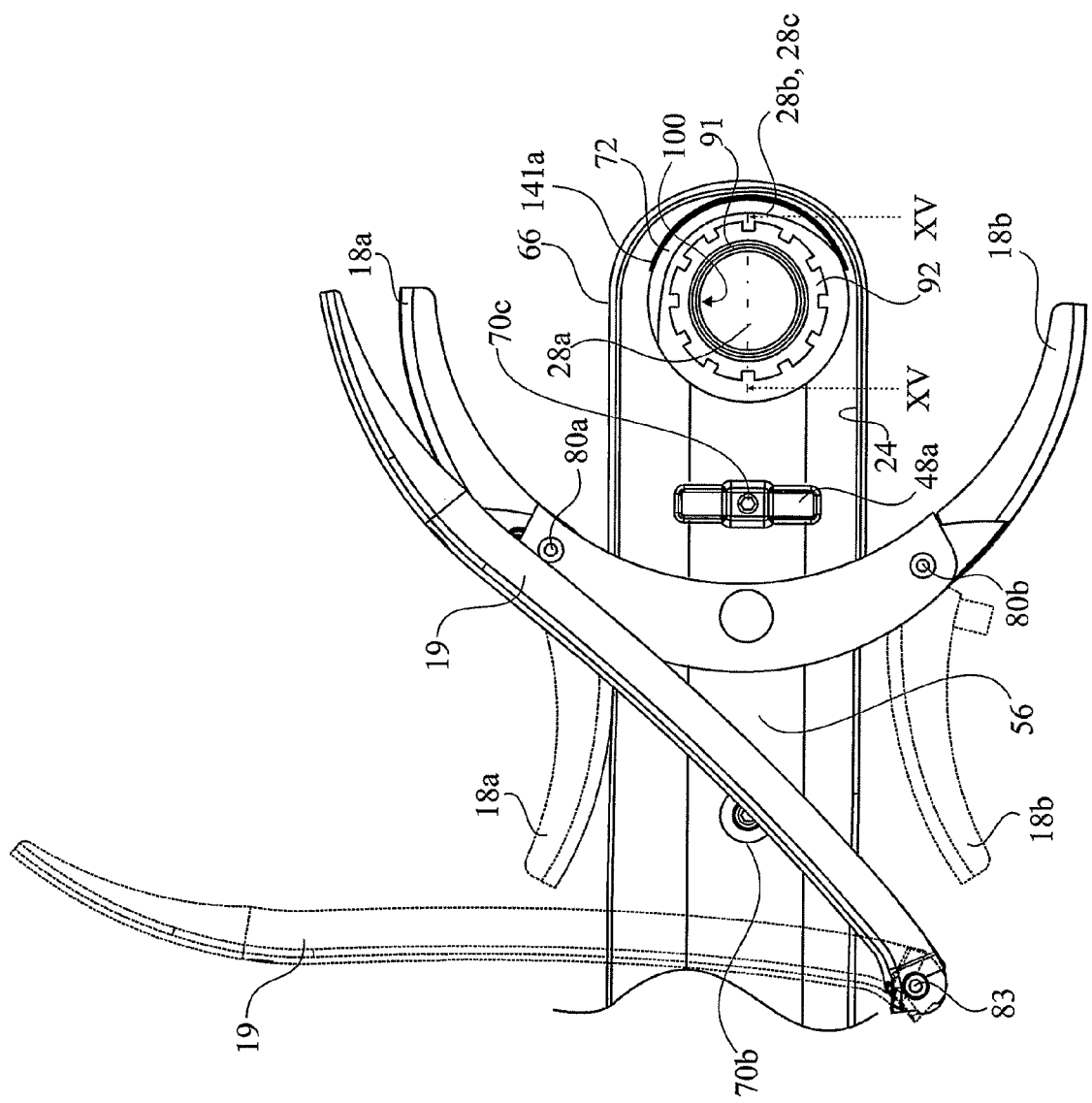
FIG. 11 shows the major part of the tool carrier from the right, two front blade guards and a rear blade guard, a tool assembly shown in FIGS. 1 and 2 being dismantled.
Figure 12:
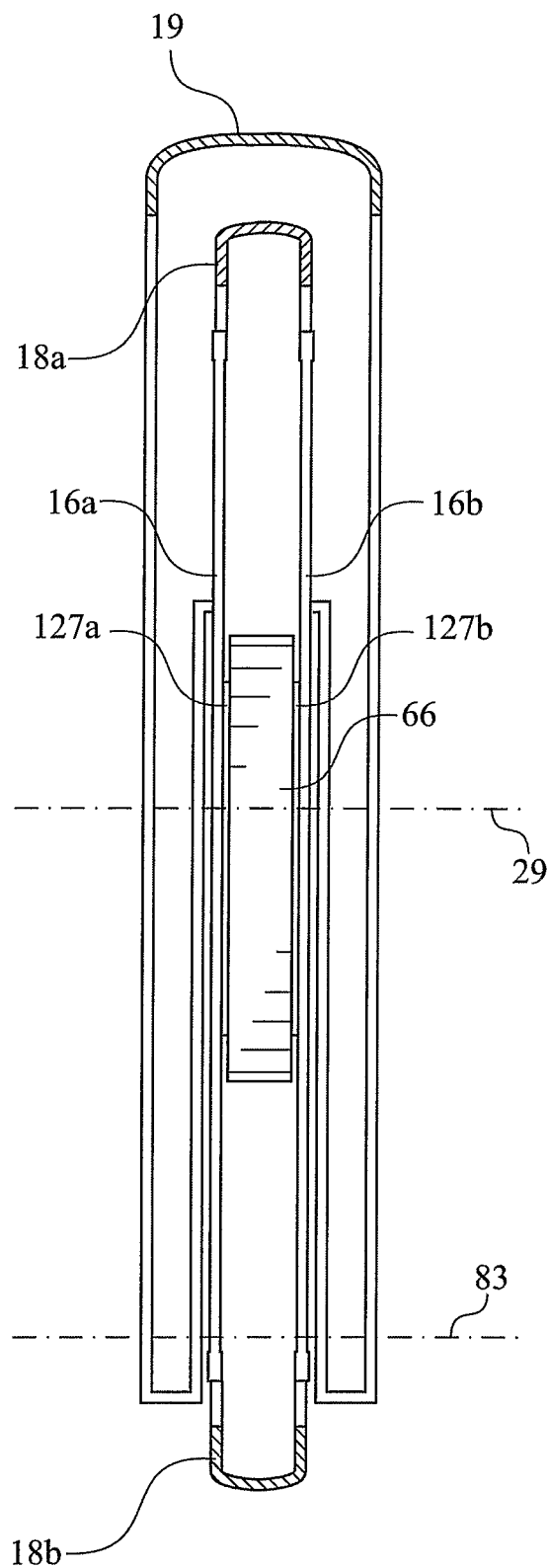
FIG. 12 shows the tool carrier, the tool assembly and the blade guards in a view along the line XII-XII of FIG. 1.

With reference first to FIGS. 1 and 2, a cutter, which is a portable, hand held cutting or sawing machine, is generally designated 1. The power source of the cutter 1 is preferably an internal combustion engine 2 in a machine body 3, but also an electric, air or hydraulic motor could be used. An anti-vibrated handle system includes a front handle 4 and a rear handle 5 with controls 8. The front and rear handles are connected to one another on the right hand side of the machine. The front handle 4 extends over the machine body 3, proceeds down on the right hand side and further on by a bottom section. The bottom section serves as a support 7 under the front part of the machine body 3. The anti-vibrated handle system is completed by a vertical link 9, which connects the support 7 with the right hand parts of the system. Further, with reference to FIGS. 1 and 2, the cutter 1 has an elongated tool carrier 14 extending forwards from the machine body 3; a tool assembly 15 including two parallel, coaxial, first and second cutter blades 16a, 16b at a short distance from one another in the front end of the tool carrier 14, one on each side of the carrier; a pair of front blade guards pivotally connected to the tool carrier 14, including an upper blade guard 18a and a lower blade guard 18b; a rear blade guard 19 pivotally connected to said vertical link 9; and water supply hoses 20, 21. A centre 29 of rotation of the tool assembly 15 is common to all the rotary members of the assembly.

The tool carrier 14 essentially consists of a first dish-shaped, right hand side cover 24, FIG. 1, a second dish-shaped, left hand side cover 25, FIG. 2 (the covers 24 and 25 may also be referred to as panels); and a central, elongated plate 23, FIG. 3, which extends between and is secured to the side covers, in the following referred to as first and second dishes 24 and 25, respectively.

The plate 23 is preferably made of a hardenable, stainless steel grade, which normally is employed for springs. It has preferably a thickness of only 3 mm, which makes it comparatively light, and is hardened and tempered to provide a desired combination of strength and toughness. However, it could be manufactured from steel, aluminium or a composite material. Its width continuously increases in the direction from the rear end to the front end. In the front end, adjacent to the front tip 27 of the plate, there is provided a major, circular hole 28a. In the assembled tool carrier and tool assembly, the centre of the hole 28a coincides with the centre of rotation 29 of the cutter blades 16a, 16b. In the rear end of the plate 23, there is provided a slot 30a. Equal slots 30b, 30c are provided in the dishes 24, 25, establishing a joint slot 30 in the rear end of the tool carrier 14, FIG. 1, for securing the assembled tool carrier 14 to the machine body 3 in a manner known by se by means of bolts 31 and nuts 32 under a clutch cover 33 of the machine body, covering a centrifugal clutch and a driving wheel. Also a small through hole 34a is provided in the rear end of the plate 23. Further three holes 35a, 36a, and 37a are provided in the plate along a straight line extending between the slot 30a and the centre of the major hole 28a. The plate 23 is flat and is made from a blank through punching, including all the said holes 28, 34a-37a as well as the slot 30a. Punching is an inexpensive mode of manufacturing in contrast to machining, which is not employed in the manufacturing of the plate 23. Therefore, although the plate is made of stainless spring steel, it can be manufactured at a fairly low cost.

With reference to FIG. 3A, an annular bushing 75 is provided in the hole 28a of the plate 23. The bushing 75 has an internal thread 76. The bushing 75 is L-shaped in cross section, one leg 77 of the L being the threaded part of the bushing, the other leg of the L forming a flange 78. The bushing 75 is press fit in the hole 28a, forming a permanent and integrated part of the central member 23 of the tool carrier 14. The outer, cylindrical surface of the first leg 77 abuts the cylindrical surface of the hole 28a, while the flange 78 abuts that side of the plate 23 which faces the second, left hand dish 25 of the tool carrier 14. The end of the leg 77 is level with the opposite side of the plate 23, facing the first dish 24 of the tool carrier 14. The axial length of the bushing 75 corresponds to twice the measure of the thickness of the plate 23.

The dishes 24 and 25 match one another, the first dish 24 fitting as a male part in the second dish 25 which is the female part of the tool carrier assembly. Each dish may very well consist of a single part, but, according to the embodiment, each of them consists of two members. Thus the first dish 24 consists of a front member 24a and a rear 24b. Correspondingly, the second dish 25 consists of front and rear members 25a and 25b, respectively. On the first dish 24, a male rim 40 consisting of rim sections 40a and 40b on the front and rear members 24a and 24b, respectively, extends, square to the plane of the dish, along one longitudinal side from the rear end thereof, around the rounded front of the dish and along the opposite longitudinal side to the rear end of that side. Correspondingly, a matching female rim 41, composed of rim sections 41a and 41b, is provided on the second dish 25, following the same pathway as the male rim 40 of the first dish 24. The width of the first dish 24, i.e. the distance D1 between the outer surfaces of the opposite parts of the rim 40, FIG. 4B, equals the distance D2 between the inner surfaces of the opposite parts of the rim 41, FIG. 5B, allowing the first dish 24 to be inserted into the second dish 25 with a snug fit between the rims 40 and 41, including a snug fit also in the region of the rounded front parts of the dishes, FIG. 21.

The first and second dishes 24 and 25 are provided with a major, circular hole 28b and 28c, respectively, in the front part of the front members 24a and 25a, respectively. The holes 28b and 28c have a larger diameter than the hole 28a in the front portion of the central plate 23. In the assembled tool carrier 14 and in the tool assembly 15, all the three holes 28a-28c are aligned and coaxial with the centre of rotation of the cutter blades 16a and 16b.

The front and rear members 24a and 24b of the first dish 24 are also provided with small holes 35b, 36b' and 36b", 37b, respectively. Correspondingly, the front and rear members 25a and 25b of the second dish 25 are provided with holes 35c, 36c' and 36c", 37c, respectively. The holes 35b and 35c, and the holes 37b and 37c in the first and second dishes 24 and 25, respectively, in combination with the holes 35a and 37a in the central plate 23, serve to attach the dishes 24 and 25 to the plate 23 by means of screws and nuts. The holes 36b' and 36b", and the holes 36c' and 36", in combination with screws and nuts 70b, 71b, FIGS. 1 and 2, serve to connect the first and second dish members 24a and 24b, and 25a and 25b, respectively, with one another, and also, in combination with the aligned hole 36a in the plate 23, to assist in attaching the dishes 24 and 25 to the central plate 23. The hole 36b" of front member 24a of the first dish 24 is provided in a tongue-shaped projection 43a, which is placed inside of a front section 44a of the rear member 24b, i.e. on top of said front section 44a with reference to FIG. 4B. A circular region surrounding the holes 36b' and 36b", respectively, have the shape of matching, shallow cups 45a and 46a, respectively, which facilitate the alignment of the holes. Also the hole 35b is located in the centre of a cup shaped indentation 47a of the rear dish member, while the hole 37b is located in a trough-like indentation 48a extending in a direction transverse to the longitudinal direction of the tool carrier. The front and rear members of the second dish 25 are correspondingly provided with equally designed indentations 45b, 46b, 47b and 48b.

In this connection, reference also shall be made to FIGS. 9 and 10, which show a crescent-shaped bracket 50 which is intended to be mounted to the first dish 24 on the right hand side of the tool carrier 14, FIG. 1. In combination with a pair of brackets 51a and 51b, which are secured through welding to the second dish 25 in a mode which will be explained more in detail in the following, the bracket 50 serves to hold the front blade guards 18a and 18b. As is shown in FIG. 4B and FIG. 6B, the front section 44a of the rear member 24b of the first dish 24 is depressed to form a depression 54 which is designed such that it can accommodate the central part of the crescent-shaped bracket 50. The bracket 50, in the centre thereof, also is provided with a hole 36d in the centre of a cup shaped depression 46d, matching the cup-shaped indentations 46a and 45a of the front and second members 24a and 24b of the assembled first dish 24.

The rearmost section of the rear member 24b of the first dish 24 is also depressed, the rearmost depression being designated 55, in order that said rearmost section shall be accommodated under the clutch cover 33 of the machine body 3. The first dish 24 also has a longitudinal, central depression 56 extending from the front edge of the clutch cover 33, forming an extension of a depression 57 in said clutch cover 33, all the way to the front end of the dish. The depression 56 increases the rigidity of the first dish 24 and it also has aesthetic merits, being an extension of the depression 57 in the clutch cover 33. In the depression 55, there is also a central, deeper depression 58a on both sides and in front of a slot 30b and a hole 34b corresponding to the slot 30a and the hole 34a, respectively, in the central plate 23. Two small holes 59a are symmetrically provided in the first dish 24 in the region of the central depression 56, adjacent to the second major hole 28b, and equal holes 59b are provided in the second dish 25.

Also the rear member 25b of the second dish 25 is provided with a rear slot 30c, a hole 34c and a depression 58b corresponding to the slot 30b, hole 34b and depression 58a of the rear member 24b of the first dish 24.

In the front and rear members of the second dish 25, metal strip sections 61a and 61b are provided at a short distance from the upper part of the rim 41, which in combination with the dishes 24 and 25 form a sheltered passageway 62 for the water hose 21. The passageway 62 has an inlet 63 adjacent to the machine body 3 and an outlet 64 adjacent to the front holes.

The dishes/panels 24 and 25 are made of thin steel sheet, e.g. of zinc-plated steel sheet, with a thickness of about 1 mm, which makes it possible to manufacture the dish members through punching and pressing operations which is convenient from an economical point of view. Also aluminium or other light metals or plastic materials may be considered. The dishes 24, 25 in combination with the central plate 23 provide a desired strength to the tool carrier 14. They also serve to shelter the power transmission, which includes a driving V-belt, and the water hose inside the tool carrier. However, they do not afford a sufficient wear resistance to the front portion of the tool carrier between the blades 16a and 16b, when the cutter 1 is operating in concrete or other hard working material. Therefore a reinforcing strip 66 of wear resistant steel is provided outside the rim-section 41a of the front member of the second dish 25. The wear resistant strip 66 is attached to the rim section 41a through welding. The brackets 51a, 51b in turn are attached to said wear resistant strip 66 through welding. FIG. 8A.

When assembling the tool carrier 14, the front section 44b is placed on the inner surface of the matching rear section 44b' of the front member 25a of the second dish 25, such that the holes 36c' and 36c" will align. A screw 70b is inserted through the aligned holes and a screw 70a, 70c is also inserted in each of the holes 35c and 37c. The screw heads are recessed in the cup-shaped depressions surrounding the holes. The plate 26 then is placed on the inside of the assembled second dish 25 so that the screws 70a-70c will extend also through the holes 35a-37a of the plate 23, the flange 78 of the permanently secured bushing 75 facing said second dish 25.

Above has been described one embodiment of the tool carrier, but there are several others. An important feature of this invention is that either one of the side walls or of a possible central elongated member is provided with a bearing hole. In the above described embodiment the bearing hole is provided in the central elongated member 23. By using a single bearing or bearing unit provided only in one of the members the width of the distance between the tools can be reduced, and thereby the width of the cut. The power transmission includes an endless drive chain or preferably a drive belt, which is movable within a plane and the bearing or bearing unit is located essentially within said plane. However, the tool carrier can also be arranged without a central member 23. Instead it then uses two side walls, a first and a second side wall. And the bearing hole is arranged in one of those. Preferably the second side wall 25 is arranged as a strong side wall having the bearing hole carrying a bearing or bearing unit. This side wall preferably has edge sides outside of the drive belt, preferably on both edges to protect the belt. Assuming that the second side wall 25 and the central member 23 of the first embodiment would have been welded together this would instead create a strong second side wall to be covered with a lid-like first side wall 24. However, this strong side wall could during part of its length even have a first side wall 24 of the opposite broad side of the tool carrier 25. But this does not apply to both ends of the tool carrier as it must be possible to remove the drive belt for changing it. This creates however a closed section during a part of the length of the tool carrier, thereby increasing its stiffness towards bending or twisting. The material of such a strong side wall having the bearing hole is either aluminum, iron or steel and preferably formed by casting, e.g. die-casting, or is a composite material. The other side wall that does not carry the bearing hole is preferably made like a lid and preferably covers the first broad side of the tool carrier at least partly. This always refers to the front part of the tool carrier to make it possible to exchange the drive belt. Such a side wall is preferably made of steel, aluminium or a composite material.

Figure 22A:
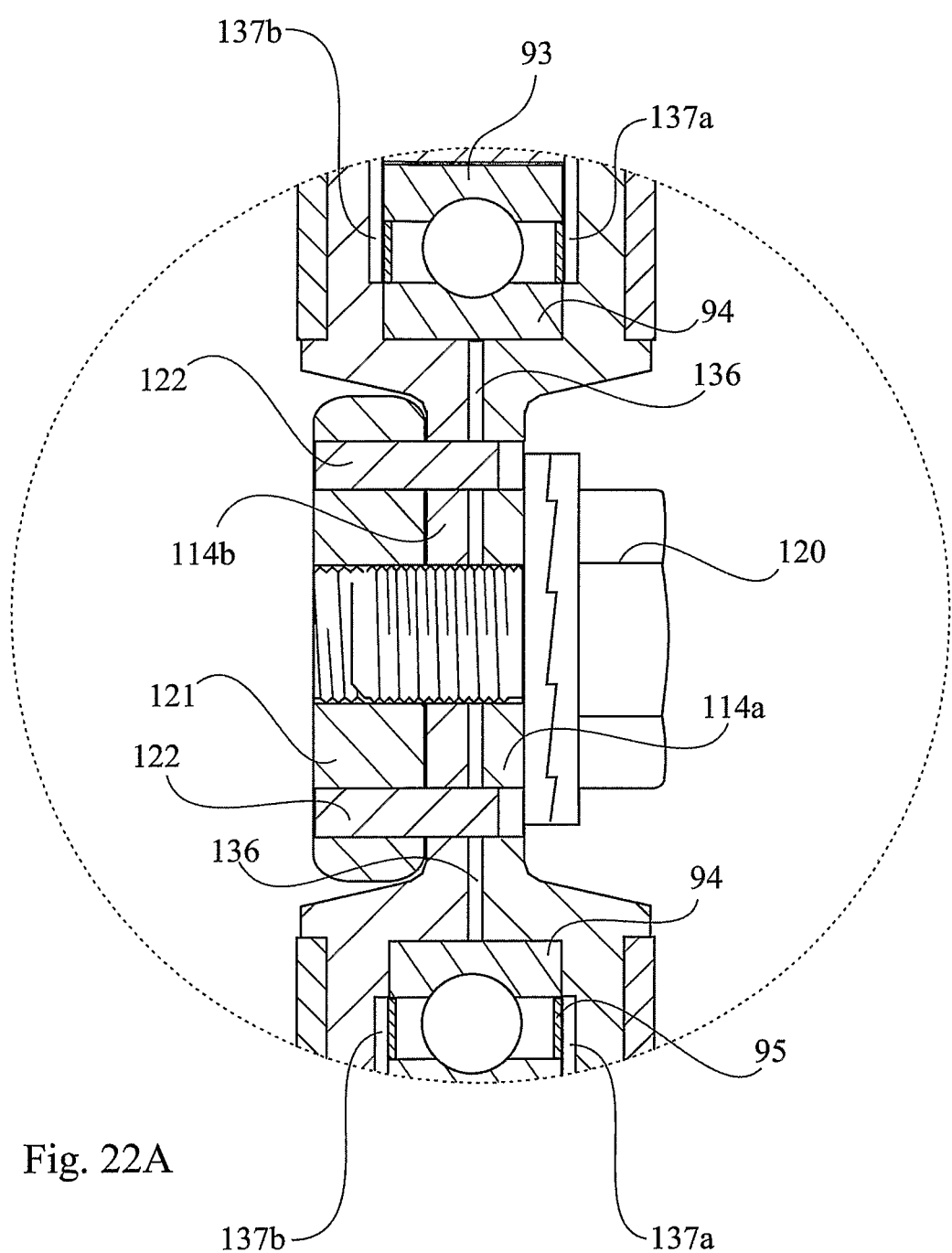
FIG. 22A shows an encircled detail A of FIG. 22 in a different rotational position and at a larger scale.

Prior to completing the assembly of the tool carrier 14, a V-belt 72 is provisionally placed such that it will embrace the plate 23 around and along it. The V-belt 72 is laid around a driving pulley 73, and the partly assembled tool carrier is attached to the machine body 3 such that the bolts 31 will be accommodated in the slots 30a, 30c. Now the rear member 24b of the first dish 24 can be added, such that the rear slot 30b will be aligned with the mentioned slots 30c and 30a, said slots 30a-30c in combination defining the slot 30. The screw 70a provided in the holes 35c and 35a also extends through the hole 35b of said member 24b. Said rear member 24b of the first dish 24 now may be secured by means of said screw 70a running through the holes 35c, 35a and 35b and a tightening nut 71a, which will be recessed in the cup shaped indentation 47a of the rear dish member 24b. FIG. 22. The clutch cover 33 then is attached to the machine body 3 and is secured by means of the nuts 32 on the bolts 31. Finally, also the front member 24a of the first dish member 24 is mounted to complete the tool carrier 14 wherein the tongue-shaped projection 43a is placed in the region of the inside of the front section 44a of the rear member 23b. The front member 24a is secured by means of the previously mentioned screws and nuts 70b, 71b and the assembly of the tool carrier 14 is completed by means of a screw 70c running through the holes 37c, 37a, 37b, and a nut 71c, FIG. 22. A spring clip (not shown) may be provided under the screw head of the screw 70c and under the nut 71c, respectively, accommodated in the trough-like indentations 48a, 48b in order to reduce any possible deflection of the cutter blades during operation.

When tightening the screws 70a-b and nuts 71a-b, the material of the dishes 24 and 25 in the region of the indentations 48a, 45a, 47a and 48b, 45b and 47b, respectively, will be pressed tightly against the central plate 23, wherein a composite bar structure is established, which increases the bend strength of the tool carrier 14 considerably.

The composite bar structure, which is possible to dismantle through unscrewing the screws, may also be referred to as a framework or girder structure of small size. For the different versions having only two side walls the assembly is made in a corresponding way to the above described, bearing in mind that the strong side wall exchanges the central member.

The upper front blade guard 18a is pivotally connected between on one hand the upper portion 50a of the crescent-shaped bracket 50 which is fastened to the first dish 24 and on the other hand to the upper bracket 51a which is welded to the second dish 25. Correspondingly, the lower front blade guard 18b is pivotally mounted between the bracket portion 50b and bracket 51b. The centres of turning are designated 80a and 80b, respectively.

The blade guards 18a, 18b, which are preferably made of a tough and strong plastic material, are designed as end portions of a crescent, which has a shape corresponding to the shape of the bracket 50. Further, the upper and lower blade guards 18a and 18b are U-shaped in cross section, the interior of the U facing the cutter blades 16a and 16b. The distance D3 between the outer surfaces of the legs 81a, 81b of the U does not exceed the distance D4, FIG. 22, between those parts of the blades 16a and 16b, which project maximally in the lateral directions. This means that the distance D3 is smaller, but only slightly smaller than the width of the groove, which will be established by means of the cutter 1 in the working object. The front blade guards 18a and 18b can be folded back about their axes of turning 80a and 80b, respectively, such as is indicated by ghost lines in FIG. 11 in order that the front blade guards 18a, 18b, when they are inserted into the groove, which has been established in the object that is being worked, will not prevent the rotating cutter blades from, working further into the working object, in directions square to the axis of rotation and to the longitudinal direction of the tool carrier 14.

The rear blade guard 19 is also U-shaped in cross section and is pivotably connected to the vertical link 9 under the tool carrier 14. The tip portion 86 is made of resilient rubber, while the main part consists of a strong, rigid and tough plastic material. The centre of turning of the blade guard 19 is designated 83. All the way from the bottom end of the blade guard 19 up to more than half the length of the blade guard 19 there is provided a central slot 84. The blade guard 19 in other words is designed as a fork having one leg on each side of said slot 84, a first one 85*a* to the right of the tool carrier 14 and a second one 85*b* to the left of the tool carrier. The width of blade guard 19 exceeds the width of the front handle guards 18*a* and 18*b* and it is also larger than the width of the cleared groove which is established in the object that is being worked by the cutter 1. This means that the resilient nose 86 of the rear blade guard 19 will contact the wall of the object that is being worked, when the blades 16*a*, 16*b* has penetrated the working object to a certain depth, whereupon the nose 86 will slide against the wall as the tools successively proceed deeper into the object, folding the rear blade guard 19 upwards, pivoting it about its axis of turning 83. A helical spring 87 (not shown) will return the blade guard 19 to its original position shown in the drawings, when the cutter is withdrawn from the object that has been worked. There could also be a second rear blade guard and this could preferably be pivotably connected to the first rear blade guard, or it could be pivotably connected to the tool carrier or the machine body. By using two rear blade guards even more protection is attained and they could be used also without using any front blade guards.

FIG. 13 is a side view of a bearing unit 90 consisting of a single-row rolling bearing 91 and an annular bearing holder 92. According to the embodiment, the rolling bearing 91 is a ball bearing, which has an inner ball bearing ring 93, an outer ball bearing ring 94 and an annular shield 95 between the ball bearing rings. The bearing holder 92 has an inner cylindrical surface 96, the diameter of which corresponds with the outer diameter of the outer ball bearing ring 94. The outer ring 94, and hence the entire ball bearing 91, is permanently secured through press fit to said cylindrical surface 96, FIG. 14, of the bearing holder 92, such that the bearing 91 and its bearing holder forms a permanent unit. The axial lengths of the ball bearing 91 and its holder 92 are approximately equal.

As viewed in FIG. 14, the bearing holder 92 is L-shaped in cross section. The vertical column of the L is pressed with its cylindrical surface 96 against the cylindrical surface of the outer ring 94 of the ball bearing 91 as mentioned in the foregoing, while the horizontal part of the L forms a flange 97 pointing radially outwards. The exterior of the vertical part of the L is threaded. The threads are designated 98, the axial length of which corresponds to the axial length of the bushing 75, FIG. 3A. The threads 76 of said bushing 75 match the threads 98 of the bearing holder 92. The bushing 75 and the bearing holder 92 in other words form threaded female and male members, respectively, or a nut and a screw of a nut and screw coupling which is applied for mounting the bearing unit 90, and hence the ball bearing 91, in the front hole 28*a* of the plate 26, clamping the plate 26 between the flange 78 of the bushing 75 and the flange 97 of the bearing holder 92. The flange 97 is provided with a great number of recesses 99 along its circumference adapted to an appropriate tool for screwing the bearing unit 90 into the bushing 75, for mounting the bearing unit 90 a new, fresh ball bearing, and/or for dismantling the bearing unit 90 if the bearing 91 is worn out and has to be replaced. The bearing holder 92 is accessible through the hole 28*b* in the front member 24*a* of the right hand, first dish 24 of the tool carrier 14, when the tool assembly 15 has been removed, FIG. 11.

FIG. 15 shows the ball bearing assembly 100 assembled. The assembly is easily made by screwing the ball bearing unit 90, FIG. 13 and FIG. 14, into the bushing 75, which is secured in the major hole 28*a* of the central plate 26 and forms an integrated part of the central member 23, FIG. 3 and FIG. 3A.

In the tool carrier 14, the first and second dishes 24, 25 form a casing, which forms a shelter for the driving V-belt 72 as well as for the water hose 21, which extends along the upper wall of the casing, above the V-belt.

In a manner known per se, the tool assembly 15 includes the first and second cutter blades 16*a*, 16*b* and a split belt pulley 101, consisting of the first and second driving members 102*a* and 102*b*, referred to as driving wheel halves in this context. The driving wheel halves are clamped together by means of a screw- and nut coupling 103 to establish said belt pulley 101. More specifically, according to the preferred embodiment, the tool assembly 15 consists of a first and a second tool unit, 104*a* and 104*b*, respectively, and said coupling 103. Each tool unit, such as the second tool unit 104*b*, FIG. 18 and FIG. 19, consists of a cutter blade 16*a* and a driving wheel half 102*b*.

The driving wheel halves 102*a*, 102*b* are equally designed according to principles disclosed in said EP-1 252 956-A. Thus, with reference to FIG. 16 and FIG. 17, the driving wheel half 102*a* has, on a first side 105*a* thereof, an annular surface 111*a* which is flat in order to be able to contact a flat first side 88*a* of a first cutter blade 16*a* and to be permanently (according to the embodiment) secured said cutter blade in order to form said first tool unit 104*a*. The flat annular surface 111*a* extends from the periphery of the driving wheel half to an annular projection 108*a*, which is designed such that it can extend into and fit in a central hole of the cutter blade 16*a*. Radially inside of the annular projection 108*a* there is circular, central recess 109*a*, which has a depth which corresponds to more than half of the maximal thickness of the driving wheel half. On the opposite, second side of the driving wheel half, the peripheral portion 110*a* has an annular, bevelled surface 112*a*. Radially inside of the peripheral, chamfered portion 110*a*, on said second side 106*a*, there is a major, annular recess 113*a*, which extends in the radial direction from said peripheral portion 110*a* to a central portion 114*a* of the driving wheel half. Adjacent to said central portion 114*a*, there is provided an annular shelf 115*a*, forming a slight elevation of the bottom of the annular recess 113*a*, FIG. 16A. The width of the shelf equals, or is slightly smaller than the width (radial extension) of the inner ball bearing ring 93.

The end surface 119*a* of the central portion 114*a* on said second side 106*a* of the driving wheel half 102*a* is completely flat and is square to the centre axis of the driving wheel half. The thickness of the end wall 107*a* of the central portion 114*a* is quite small; only about 2.5 mm according to the embodiment, corresponding to less than half of the maximal axial extension of the driving wheel half and also less than the depth of the central recess 109*a*, which affords the end wall 107*a* a certain degree of flexibility. A central clearance hole for a clamping screw 120 is designated 116*a*. Two diametrically opposed coupling holes 117*a* also extend, at a distance from the central hole 116*a*, through the central portion 114*a*. The outer surface 118*a* of the central portion is circular-cylindrical. The radius of the cylindrical surface 118*a* equals, or is slightly smaller than the inner radius of the inner ball bearing ring 93. The axial distance D5 between the shelf 115*a* and the plane of the flat end surface 119a of the central portion 114a is slightly, although in this connection significantly, smaller than half of the axial thickness of the inner ball bearing ring 93.

Figure 22B:
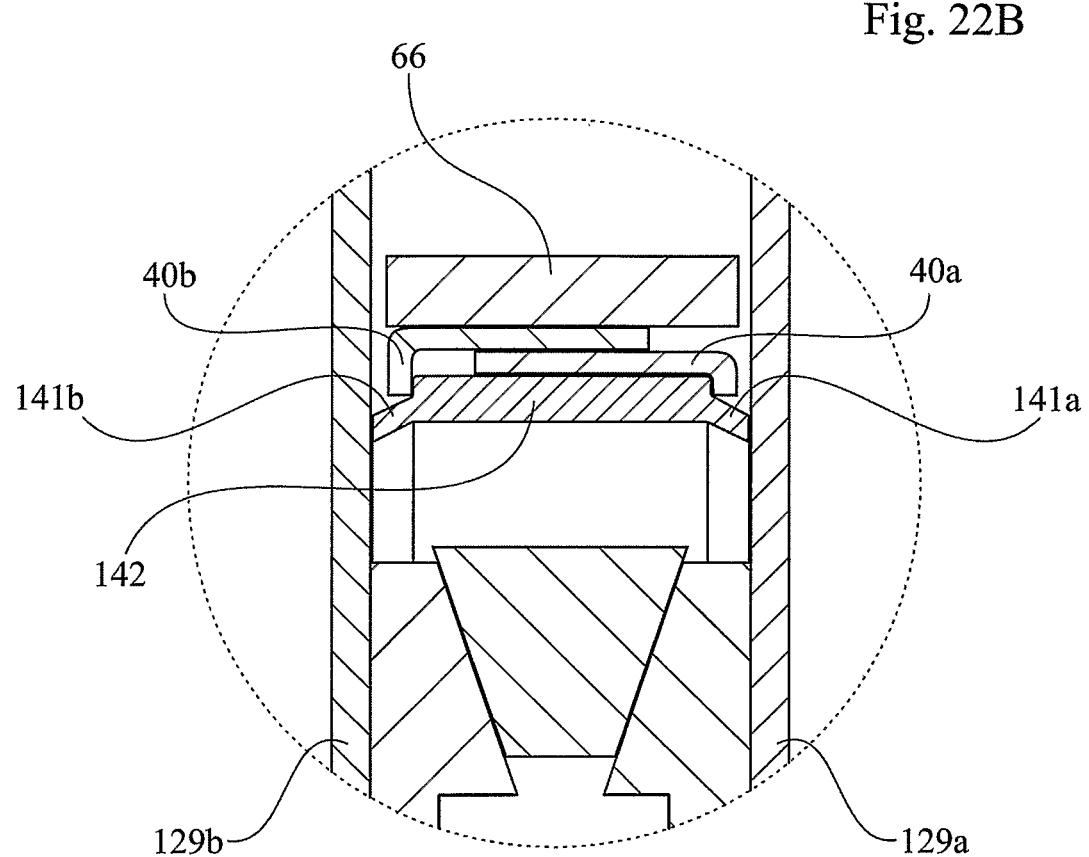
FIG. 22B shows an encircled detail B of FIG. 22 at a larger scale.

The outer radius of each of the driving wheel halves 102a, 102b, the outer, cylindrical surfaces being designated 127a and 127b, respectively, is smaller than the radius of each of the major holes 28b, 28c that is provided in the front portion of the first and second dish 24, 25, respectively. This means that the driving wheel halves of the assembled tool assembly 15 can be accommodated in said holes 28b, 28c, as is shown in FIG. 22, which will be discussed more in the following. The play 128a and the play 128b (the width of the annular gaps) between the edge of the respective hole 28b, 28c and the peripheral cylindrical surfaces 127a and 127b of the driving wheel halves 102a and 102b, respectfully, which are accommodated in said holes, amounts to 1-10 mm, preferably to 2-5 mm, suitably to not more than 4 mm. A play of that order is sufficient for preventing direct contact between the rotating wheel halves. At the same time the inflow of saw cuttings, dirt and/or liquid through the gaps 128a and 128b from the saw kerfs/groove where the cutter blades are operating, may be maintained at a low level. However, in order to prevent inflow of such undesired products more efficiently, and particularly to hinder water or other liquid from entering the region of the driving wheel consisting of the two driving wheel halves, a sealing element 140 may be provided in the front part of the tool carrier, including a sealing sleeve 141a,b in each of said gaps 128a, 128b. The sealing element 140 and its functioning will be explained more in detail in the following with reference to FIGS. 22B-25.

As far as details of the second tool unit 104b and of the second driving wheel half 102b are concerned, the same reference numerals are used in this text and in the drawings as for corresponding details of the first tool unit 104a and of the first driving wheel half 102a but with the replacement of the "a" by a "b".

Figure 19:
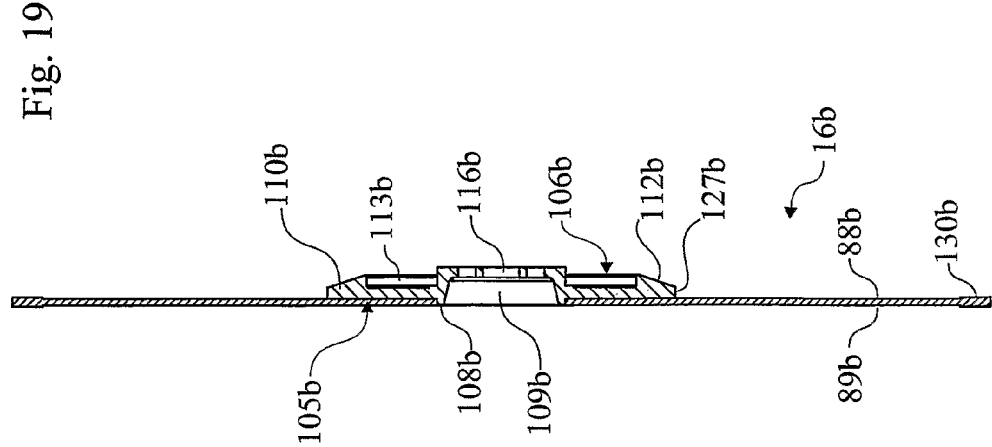
FIG. 18 is a side view and FIG. 19 is a cross sectional view of an integrated tool unit consisting of a tool and a driving member.
Figure 18:
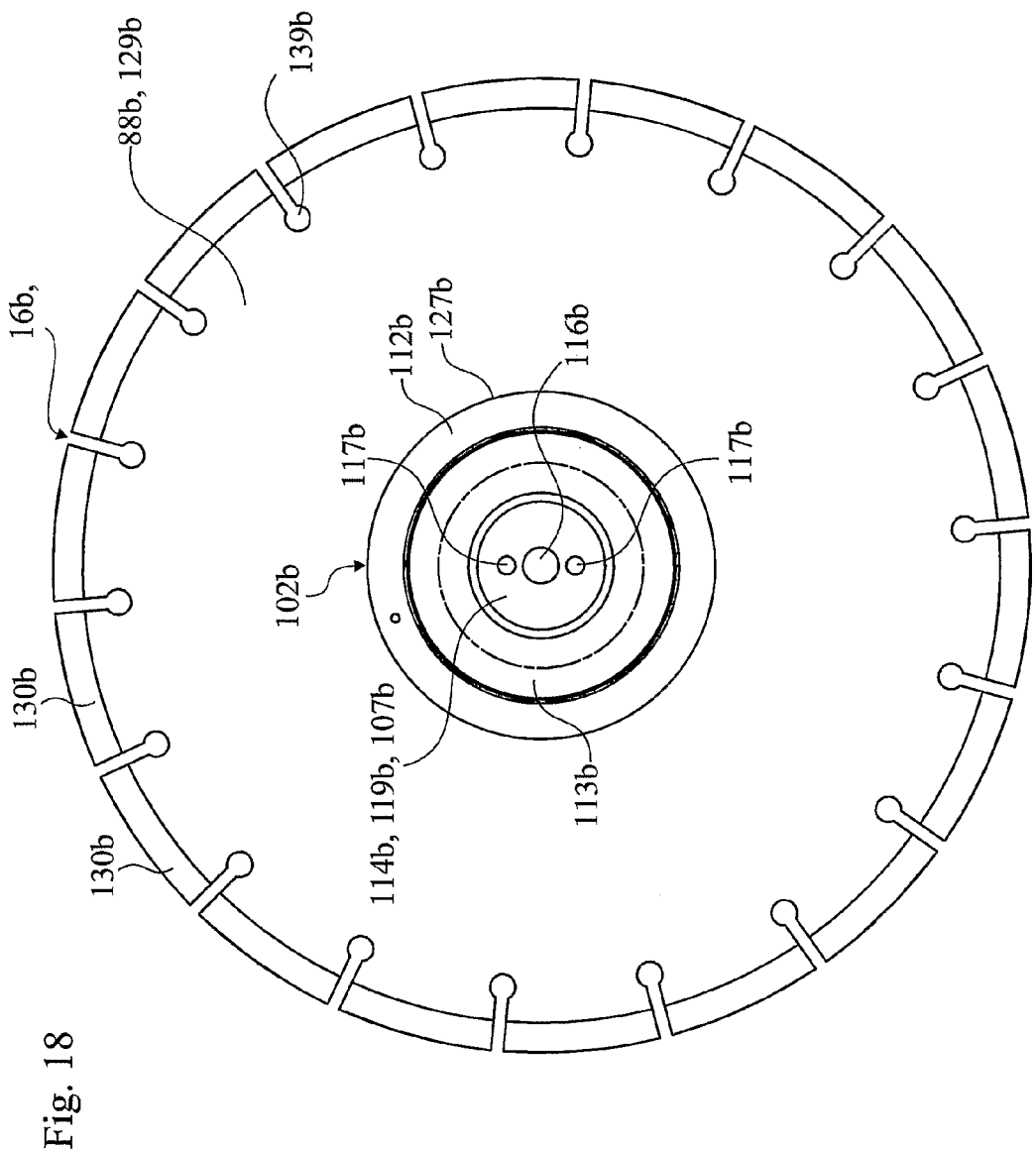

The cutter blades 16a, 16b are conventional diamond-tipped discs, although also other cutting tools may be considered, such as abrasive discs. With reference to FIGS. 18, 19 and 22, each cutter blade conventionally consists of a flat disc 129a, 129ba of steel, on which elements 130a, 130b, which contain industrial diamonds held together by a bonding agent, in the following referred to as diamond elements, are tipped all around the periphery of the disc. The flat annular surface 111a of the first driving wheel half 102a is permanently secured through welding to the flat first side 88a of the first cutter blade disc 129a to form the first tool unit 104a. Correspondingly, the second tool unit 104b is formed of the second cutter blade 16b and the second driving wheel half 102b. The edge portions/diamond elements 130a, 130b form the working parts of the tool units and are thicker than the rest of the cutter blades. The latter implies that the side of the diamond elements 130a, 130b which forms part of the second side 89a and 89b of each cutter blade 16a, 16b, in a manner known per se, define a plane which forms a limit of the, in the axial direction, maximally projecting part of the tool assembly 15.

Figure 20:
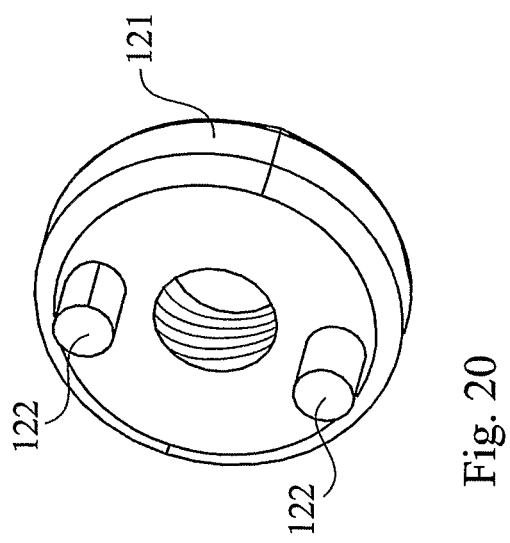

With reference to FIG. 20, a clamping nut 121 is provided, on one side of the nut, with two axially protruding fixing pins 122, one on each side of the threaded hole in the nut. The fixing pins 122 are cylindrical and have a diameter, and are provided at a distance from one another, matching the size of and distance between the coupling holes 117a and 117b of the central portion 114a and 114b, respectively of the driving wheel halves 102a, 102b. The length of the pins 122 corresponds to the total length of the pairwise aligned coupling holes 117a and 117b, FIG. 22.

Figure 21:
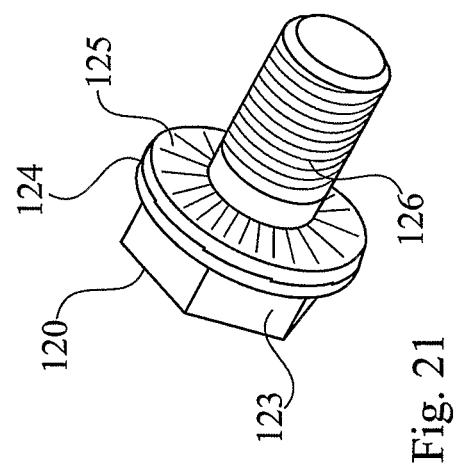
FIG. 20 and FIG. 21 are perspective views of a nut and of a screw and a washer, respectively, for assembling the drive members to form a belt pulley with the integrated bearing assembly in the front portion of the central plate of the tool carrier.

A coupling screw 120, FIG. 21, that matches the clamping nut 121, is a conventional screw, which is completed with a double lock washer 124 of the type known under the trade name NORDLOCK, in order to prevent unintentional unscrewing because of vibrations during operation of the machine 1.

In the tool assembly 15, the diamond elements 130a,b account for by far the major part of the total costs. Therefor, when the diamond elements 130a,b are worn out, the rest of the tool units 104a, 104b is of little value. Therefor the entire tool units 104a, 104b are to be regarded as articles of consumption. Likewise, the ball bearing unit 90, which consists of the ball bearing 91 and the holder 92, is an article of consumption which shall be possible to be replaced readily, although not as frequently as the tool units. According to an aspect of the invention, all parts of the machine which have some importance in this connection are designed in a mode which allows easy dismantling and replacement of any articles of consumption. The integration of the cutter blades and the driving wheel halves, as well as the novel features of the driving wheel halves in combination with the novel coupling, including the novel clamping nut and clamping screw, for example, are features which in combination contribute to an easy dismantling and replacement of the worn out cutter blades. At the same time, the tool carrier is designed such that it i.a. provides a good protection of the power transmission, including the drive belt 72, as well as of the critical parts of the water supply hose 21 and of the ball bearing 91, which promotes a prolonged service life of those parts.

Now, with reference first to FIG. 11, it is understood that dismantling of a worn out ball bearing 91 and replacing it by a fresh one, is readily performed in the machine of the invention. The ball bearing unit 90, consisting of the ball bearing 91 and its surrounding holder 92 is visible and accessible through the major hole 28b in the first dish/side cover 24. The hole 28b is considerably larger not only than the major hole 28a in the central plate 26 but also so much larger than the ball bearing holder 92 that engagement means of an appropriate tool, e.g. the pins of a conventional pin spanner, can be entered through the hole 28b into engagement with two of the recesses 99 of the ball bearing holder. The ball bearing unit 90 containing the worn out ball bearing 91 in the holder 92 now is unscrewed by means of the spanner and is replaced by a new ball bearing unit 90 of the same type, containing an identical but fresh ball bearing 91. The new ball bearing unit 90 is screwed into engagement with the bushing 75, initially by hand and then by means of the same spanner or other tool that was used for unscrewing the ball bearing unit. Since dismantling of worn out cutter blades is more frequent than exchange of ball bearings, exchange of ball bearings is conveniently carried out in connection with dismantling and exchange of cutter blades.

Now reference is made to FIG. 22 so as to describe the machine according to the embodiment of the invention including also the tool assembly as well as other components according to various aspects of the invention. In the drawing, some details are shown more schematically, such as the first and second side covers/dishes 24, 25. The left, bottom part of the drawing shows how the rear parts of the dishes 24, 25, each one shown consisting of a single element, and the rear part of the central plate 26 of the of tool carrier 14, are clamped between the machine body 3 and the clutch cover 33 by means of the bolts 31 and nuts 32, keeping the assembled tool carrier 14 in a firm grip.

The endless V-belt 72 extends around and between the drive pulley 73 and the split belt pulley 101. The drive pulley is powered in a conventional way by the internal combustion engine 2 via an axle shaft and a clutch coupling. The V-belt 72 is tensioned in any convenient way, e.g. by means of a conventional belt tensioner, including a schematically shown tension screw 133 and a pawl, which extends into the aligned holes 34a-c in the clamped part of the tool carrier 14. By means of the screw 133 and the pawl, which can be displaced to and fro, displacing also the entire tool carrier 14, the V-belt 72 can be tensioned or the belt tension be released as desired, when the clamping pressure exerted by the screws 31 and nuts 32 is eased.

In the belt pulley 101, which also may be referred to as a driving wheel, the V-belt 72 is pressed against the bevelled surfaces 112a and 112b of the driving wheel halves 102a, 102b, which face one another, forming between them a V-groove 134. The shape of the V-groove 134 is adapted to the design of the V-belt 72, and the contact pressure is adjusted by means of the belt tensioner.

The cylindrical, peripheral surfaces 127a and 127b of the belt pulley 101/assembled driving wheel halves 102a, 102b extend from the planes of contact with the cutter blade discs 129a and 129b, which are outside of the side covers/discs 24 and 25, through the major holes 28b and 28c, respectively, to the V-groove 134, which is located inside of the covers/discs 24 and 25. The cylindrical, peripheral surfaces 127a and 127b in other words form a transition passing the holes 28a and 28b between the V-groove 134 inside the sheltering tool carrier 14 and the cutter blades 16a and 16b outside of the tool carrier 14. As mentioned in the foregoing, the play 128a and the play 128b between the driving wheel halves 102a, 102b, represented by their cylindrical surfaces 127a and 127b, respectively, and the edges of the holes 28b and 28c is only a few mm, which is important because any inflow of dust or other impurities into the tool carrier thence can be kept at a low level and/or facilitates the provision of efficient sealings, as will be described in the following.

Also the width of the gaps 135a and 135b between the sides of the tool carrier 14 and the cutter blades 16a and 16b are small; the order of about 1 mm. This is made possible through the provision of the ball bearing assembly 100 inside of the tool carrier and inside of the belt pulley 101, rather than outside of the tool carrier, between the tool carrier and the pulley as suggested by the prior art disclosed in said U.S. Pat. No. 4,717,205. For this achievement, it is also important that the axial length of each of the cylindrical surfaces 127a and 127b is short, i.e. the axial distance between the V-groove 134 and each of the steel discs 129a and 129b, respectively, is short, e.g. about 2 mm, which promotes the distance between the cutter blades to be short. This in turn means that also the distance between the two kerfs established by the cutter blades in the working object will be correspondingly small, which facilitates the removal of the material between the kerfs for the establishment of the desired groove in the working object, into which groove the tool assembly as well as the tool carrier can be further advanced.

In the belt pulley 101/tool assembly 15, the driving wheel halves 102a, 102b/tool units 104a/104b are clamped towards but not completely against one another by means of the screw and nut coupling 103. A small gap 136 will remain between the flat end surface 119a of the central portion 114a of the driving wheel half 102a and the corresponding end surface 119b of the driving wheel half 102b, even though the clamping screw 120 is tightened up such that the end walls 107a, 107b of the central portions 114a, 114b are slightly deflected. The reason is that the inner ball bearing ring 93 is clamped between the shelf 115a of driving wheel half 102a and the corresponding shelf 115b of driving wheel half 102b and because the distance D5 is smaller than half the axial width of the ball bearing 91.

Starting from the assembly shown in FIG. 11, the assembly of the tool assembly 15 as shown in the above discussed FIG. 22 now shall be described. The bearing assembly 100 is already mounted on the central plate 26 around its major hole 28a as has been described in the foregoing. The V-belt 72 is untensioned and is hanging loose in the tool carrier 14. A small part of it can be seen through the hole 28b, FIG. 11. Now the tool units 104a and 104b shall be mounted, which is readily carried out in the following way. To start with, the clamping nut 121 is assembled with one of the identically designed tool units, more specifically with the second tool unit 104b on the first side 105b of driving wheel half 102b. The fixing pins 122 are inserted into the coupling holes 117b in the central portion 114b of the driving wheel half 102b and the nut body 138 is pushed into the recess 109b to contact the end wall 107b in the bottom of the recess 109b. The entire nut body 138 is accommodated in the recess 109b, i.e. no part protrudes beyond the annular projection 108b. Now, the assembly consisting of the tool unit 102b and the clamping nut 121 is brought to its position shown in FIG. 22, wherein the central portion 114b is moved into the ball bearing 91, such that the shelf 115b will contact the inner ball bearing ring 93 at the same time as the peripheral driving wheel surface 127b adopts its position right in the hole 28c in dish 25. The V-belt 72, which is hanging loose around the ball bearing assembly 100, may be pushed aside by the bevelled surface 112b, approaching its final position in the front portion of the tool carrier 14.

Next, the operator moves the first tool unit 104a into its position of FIG. 22, on the right hand side of the tool carrier 14 such that the central portion 114a will enter the ball bearing 91, the end sections of the fixing pins 122, which protrude from the opposite side, entering the coupling holes 117a of the central portion 114a, and the shelf 115a will contact the inner ball bearing ring 93, such that the inner ball bearing ring 93 will be accommodated between the shelfs 115a and 115b, at the same time as the cylindrical surfaces 118a and 118b of the central portions 114a, 114b will contact the cylindrical surface of the inner ball bearing ring 93, and the peripheral, cylindrical surface 127a will adopt a position right in the major hole 28b in dish 24. The V-belt 72 may be further displaced by the bevelled surface 112a in connection with the mounting of the tool unit 104a, such that it will adopt a position in the V-groove 134 that now is established between the two bevelled surfaces 112a and 112b.

The assembly is completed by inserting the clamping screw 120 into and through the central, aligned holes 116a, 116b and screwing it into the clamping nut 121. Rotation of the tool units 104a and 104b of the tool assembly 15 relative to one another is prevented by the fixing pins 122, which extend through the aligned coupling holes 117a and 117b. The tool assembly 15 in turn can be locked e.g. by placing a locking pin through and between a peripheral recess 139a of the first blade cutter 16a and a facing recess 139b of the second blade cutter 16b. When turning the clamping screw 120, the locking pin will abut the lower edge of the tool carrier 14 and permit a high torque to be applied on the clamping screw head 123 by means of a spanner of considerable length. Naturally, also a pneumatic nut tightener may be employed for tightening the clamping screw 120.

When tightening the screw- and nut coupling 103 through said high torque, the inner ball bearing ring 93 is clamped efficiently between the shelves 115a and 115b. The end surfaces 119a and 119b of the protruding central portions 114a and 114b approach one another as the end walls 107a, 107b may be somewhat deflected because of the clamping nut's 120 high torque. This may eventually cause the said end surfaces 119a and 119b to meet, but even if they do, eliminating the original gap 136 between them, the optionally tensioned end walls 107a and 107b may actively contribute to the efficient clamping of the inner ball bearing ring 93. It should also be mentioned in this connection that a small play 137a and 137b will remain between on one hand the sides of the outer ball bearing ring 94 and the annular shields 95 and on the other hand the driving wheel halves 102a and 102b in the regions of the annular recesses 113a and 113b, respectively, allowing the inner ball bearing ring 93 and hence the entire tool assembly 15 to rotate freely in the outer ball bearing ring 94, which remains stationary in the ball bearing assembly 100.

Finally, the V-belt 72 is tensioned by means of the belt tensioner of the cutter 1, whereupon the tool carrier 14 is clamped to the machine body 3 by tightening the nuts 32.

Dismantling of the tool assembly 15 is, with reference to the above description of the assembling operations, carried out the other way round and should not require any particular explanation.

Now, as far as the mode of working of the cutter 1 is concerned, this is basically the same as the mode of working described in said EP-1,252,956-A1, the disclosure of which herewith is incorporated in the present patent application by reference. Thus, the design of the cutter 1, in the first place the design of the tool carrier 14 and the tool assembly 15, makes it possible to work deeper into a working object than is possible to do by means of a conventional cutter with cutter blades of the same size. The maximal cutting depth is limited only by the length of the tool carrier, since the entire tool assembly 15 can be entered deeper and deeper into the groove that is established in the working object, once the material between the kerfs made by the two cutter blades has been removed. A new feature of the mode of operation, however, relates to the blade guards. Thus, the two front guards 18a, 18b are moved into the resulting groove in the working object, i.e. the groove that is established when the material has been removed between the two individual kerfs which are made by the two cutter blades. Further, the rear blade guard 19 is stationary, but is folded upwards and rearwards, sliding against the surface of the working object when the cutter blades have reached a certain depth. In operation, the front blade guards 18a, 18b are effective in the first place when the operate in the groove in the working object, preventing fragments of the working material from being hurled out from the groove at a high velocity against the cutter or against the operator, which could cause severe damage. The rear blade guard 19 can be regarded as a complement or as an alternative to the front blade guards, especially during the initial phase of the cutting operation, but basically it is an efficient splash guard. In this connection it should also be mentioned that the use of one, two or all the three blade guards 18a, 18b and 19 is optional. The choice may be made by the operator or by a responsible authority depending on the existing circumstances in terms of type of work, working material, supply or not supply of flushing water etc, and, not the least, be made to comply with existing safety rules.

The provision of the sealing element 140, FIG. 22b-FIG. 26, in the front part of the tool carrier is optional but is recommended, because inflow of liquid into the driving wheel consisting of the two driving members 102a and 102b could give rise to slip between the V-belt and the V-groove surfaces 112a,b. The sealing members of the sealing element are two annular sealing sleeves 141a and 141b, which are adapted to fit in the gaps 128a and 128b, respectively, between the edges of the major holes 28b, 28c of the side dishes 24, 25 and the peripheral surfaces 127a and 127b of the driving members. Provided in the said gaps 128a and 128b, the sealing sleeves 141a and 141b shall seal between the edge of the major hole 28b in the first dish 24 and the steel disc 129a, and between the edge of the major hole 28c in the second dish 25 and the opposite steel disc 129b. The two annular sealing sleeves 141a and 141b are connected with one another through a web section 142 and have the shape of lips, extending in opposite axial directions, turned slightly inwards in the radial direction. The width of the web section 142 corresponds to the internal width of the tool carrier, such that the web section 142 will fit in the front rim sections 40a, 41a of the tool carrier, FIG. 26. The web section 142 extends around somewhat more than half the circumference of the sealing element 140, leaving an opening 143 between the sealing sleeves 141a, 141b within a region of nearly half the circumference of the sealing element 140. A pair of mounting lugs 144a, 144b are symmetrically provided on the sealing sleeves 141a, 141b in said region, extending outwards in the radial direction from the sleeves. Each mounting lug is provided with two mounting pins 145a, 145b, directed axially inwards, fitting the small holes 59a, 59b in the side dishes 24 and 25, respectively.

The sealing element 140 is mounted in the tool carrier prior to mounting the tool assembly, whereupon the V-belt is guided through the opening 143, where the V-belt can run freely during operation. Finally the tool units are mounted as described in the foregoing, wherein the steel discs 129a and 129b of the tools 16a and 16b, respectively, are pressed against the sealing sleeves, efficiently sealing the gaps 128a and 128b, respectively. The sealing element 140 is made of a plastic material, which has a suitable combination of stiffness and resilience for its functioning as sealing element. It also has some wear resistance, although it should be regarded as a replacement element. Replacement suitable is performed in connection with replacement of the tool units.

The invention claimed is:

1. A cutting or sawing machine comprising a machine body, at least one disc shaped, rotatable tool, at least one rotatable driving member having a center of rotation which is coaxial with the tool, an elongated tool carrier having the substantial shape of a flat bar having a front end and a rear end, two opposite broad sides and two opposite edge sides, said rear end being connected to the machine body, said at least one tool being rotatably mounted in said front end, and a power transmission for rotation of the tool via said driving member, the tool carrier comprises at least two elongated side walls, a first elongated side wall on one broad side of the tool carrier, a second elongated side wall on the opposite broad side, said first and second side walls being essentially parallel with each other, a central elongated member between the first and second side walls, the front part of one of the side walls or the central elongated member between the first and second side walls is provided with a bearing hole intended to carry one of a sliding contact bearing or a rolling contact bearing, and the two side walls and the central member being connected to each other at a plurality of sites, and each side wall has a length adapted to essentially cover at least the gap between the machine body and the perimeter of its associated disc shaped tool, so that from each broad side of the side wall and the associated disc shaped tool together cover the power transmission;

the central member is provided with the bearing hole and is, on one side provided with the first side wall having a second major hole, and on the other side, provided with the second side wall having a third major hole, and these major holes are located outside of the bearing.

2. A machine according to claim 1, wherein each side wall runs inside of its associated disc shaped tool and ends at half the radius of the tool or closer to the center of it.

3. A machine according to claim 1, wherein the power transmission includes one of an endless drive chain or drive belt, which is movable within a plane, and each side wall is arranged to cover the side of the drive belt or chain.

4. A machine according to claim 3, wherein the bearing is located essentially within said plane.

5. A machine according to claim 1, wherein the at least one driving member between a peripheral portion and a central portion is provided with an annular recess that creates space for a bearing assembly, so that the bearing assembly is located essentially radially inside of the power transmission preferably with a drive belt.

6. A machine according to claim 1, wherein at least one of the side walls is detachable at least in part from the tool carrier to simplify service or exchange of parts of the power transmission.

7. A machine according to claim 6, wherein said side walls form parts of dish-shaped side members, including one or more rim sections along the edges of the side walls, the dish-shaped side member or members on one side of the tool carrier being a male member and the dish-shaped member or members on the opposite side of the tool carrier being a female member, the one or more rim sections of the male member or members being entered into the female member or members inside of the one or more rim sections of the female member or members, such that the thus overlapping rim sections form sections of the side edges of the tool carrier and such that the dish-shaped male-and female-wise united members form a shelter for the power transmission which is accommodated in said shelter.

8. A machine according to claim 1, wherein at least one of the elongated side walls is made up by a number of part members comprising front members and rear members.

9. A machine according to claim 1, wherein at least one of the side walls have at least one rim section in order to give the tool carrier at least one edge side located outside of the power transmission to form a shelter for it.

10. A machine according to claim 9, wherein the at least one rim section also forms at least part of the front edge of the tool carrier.

11. A machine according to claim 1, wherein a rolling bearing is provided in said bearing hole, and is therefore fastened in the central member or in a side wall.

12. A machine according to claim 11, wherein the rolling bearing forms part of a rolling bearing assembly, which includes a bushing secured in said bearing hole, and a rolling bearing unit including a bearing holder and said rolling bearing, an outer bearing ring which is secured to an inner, cylindrical surface of the bearing holder, and wherein said bushing and said bearing holder have matching inner and outer threads, respectively, and form female and male parts of a nut- and screw coupling, such that the rolling bearing assembly is assembled by screwing the rolling bearing unit into engagement with the bushing.

13. A machine according to claim 11, wherein a substantial part of the central member or the side wall having the bearing hole has a material thickness which is smaller than the axial width of the rolling bearing.

14. A machine according to claim 13, wherein said substantial part of the central member consists of a plate.

15. A machine according to claim 14, wherein the material of said plate is either steel, spring steel or a composite material.

16. A machine according to claim 1, wherein a wearing protection is provided on the front edge of the tool carrier.

17. A machine according to claim 16, wherein the wearing protection is provided on the front edge of the tool carrier, outside of said rim sections in the region of the front edge.

18. A machine according to claim 1, wherein the side walls of the tool carrier are clamped to the central member or the second side wall of the tool carrier by means of a plurality of screw and nut joints distributed along the length of the tool carrier inside a loop that is defined by an endless power transmission which is accommodated in the tool carrier.

19. A machine according to claim 1, wherein a sealing element is provided in the front part of the tool carrier, including a sealing sleeve in each of said second and third major holes, at least partly sealing a gap between the edge of each of the side holes and the respective driving member.

20. The machine according to claim 19, including two parallel, annular sealing sleeves, connected to one another through a web portion, and the sealing element does not extend along an annular circumference of each major hole.

21. The machine according to claim 20, wherein the sealing element has a length of about half the annular circumference of each major hole, said sleeves projecting outwards from the web portion in opposite axial directions.

22. The machine according to claim 20, wherein the annular sealing sleeves are provided with fastening members projecting essentially radially outwards from the web portion.

23. The machine according to claim 22, wherein a first fastening member is arranged as a tap projecting essentially radially outwards from an extension of the web arranged at one of the ends of the web.

24. A cutting or sawing machine of the type which comprises a machine body including a power source, a tool assembly including two disc shaped, rotational cutter blades, one on each side of an elongated tool carrier having a rear end which is connected to the machine body and a front end in which the cutter blades are rotationally mounted, and a power transmission for rotation of the cutter blades, the edge portions of which form the working parts of the cutter blades, said edge portions having inner sides which face one another and outer sides which define planes which form the limits of the, in the axial directions, maximally projecting parts of the tool assembly as well as of at least a major part of the tool carrier, allowing the complete tool assembly and said at least major part of the tool carrier to be entered into a groove established in a working object after removal of material between the two parallel kerfs made by the two rotational cutter blades, characterized in that it is provided with at least one of a first type blade guard and a second type blade guard, wherein the first type blade guard is a blade guard which is mounted on the tool carrier, adjacent to the tool assembly and has a width, which is smaller than the distance between said second, outer sides of the edge portions of the cutter blades and hence also smaller than the width of said groove, allowing the first type blade guard to be entered into said groove, and wherein the second type blade guard is a blade guard which is pivotally mounted to the tool carrier and turnable about a turning center adjacent to the rear end of the tool carrier and has a width which is larger than said distance between said second, outer sides of the edge portions of the cutter blades, preventing the blade guard of said second blade guard type from entering said groove but allowing a tip portion of it to slide against the outer surface of the working object when the tool assembly has entered the working object to a certain depth, turning said second type blade guard rearwards in a hinge.

25. A machine according to claim 24, wherein the tool carrier includes an outer casing having the substantial shape of a flat bar having two opposite broad sides, two opposite edge sides and a front edge, said opposite edge sides including an upper edge side and a lower edge side.

26. A machine according to claim 25, wherein a first blade guard of said first type is pivotally mounted on top of the upper edge side.

27. A machine according to claim 26, wherein said first blade guard of said first type can be pivoted about a center of turning at a distance above said upper edge side, allowing the blade guard to be folded rearwards-downwards towards said upper edge side, and preferably be able to be locked in this position, from an upraised position and vice versa.

28. A machine according to claim 27, wherein said first blade guard of said first type is designed like an end section of a crescent.

29. A machine according to claim 27, wherein a correspondingly designed second blade guard of said first type is correspondingly mounted on the lower edge side.

30. A machine according to claim 26, wherein said second section of said second type blade guard at rest rests in an inclined position against a first blade guard of said first type mounted on the upper side of the tool carrier.

31. A machine according to claim 30, wherein said second type blade guard can be folded rearwards, due to said slide between the tip portion of the blade guard and the outer surface of the working object, from said inclined position at rest to an upraised position, substantially parallel to a front side of the machine body, and wherein a return spring is provided for returning the second type blade guard to its rest position.

32. A machine according to claim 24, wherein said hinge, in which the second type blade guard is pivotally mounted, is positioned at a level below the tool carrier.

33. A machine according to claim 32, wherein a first rear blade guard of said second type blade guard has a first, lower section, which is connected to said hinge, and a second, upper section, which includes said tip portion, said first section having two elongated legs, one on each side of a slot, the width of which is larger than the thickness of the tool carrier, and wherein said first section straddles the tool carrier.

34. A machine according to claim 33, wherein a second rear blade guard of said second type blade guard is pivotally connected to the first rear blade guard, and preferably approximately halfway between its two ends.

35. A machine according to claim 24, wherein the second type blade guard is substantially wider than the first type blade guard.

36. A machine according to claim 24, wherein it is provided only with said first blade guard of said first type but with no blade guard of said second type.

37. A machine according to claim 24, wherein it is provided with said first and said second blade guards of said first type but with no blade guard of said second type.

38. A machine according to claim 24, wherein it is provided with at least one blade guard of said second type but with no blade guard of said, first type.

39. A blade guard according to claim 24, wherein it is provided with said first and said second blade guards of said first type as well as with said at least one blade guard of said second type.

40. A machine comprising a machine body, at least one disc shaped, rotatable tool, at least one rotatable driving member having a center of rotation which is coaxial with the tool, an elongated tool carrier having the substantial shape of a flat bar having a front end and a rear end, two opposite broad sides and two opposite edge sides, said rear end being connected to the machine body, said at least one tool being rotatably mounted in said front end, and a power transmission for rotation of the tool via said driving member, the tool carrier comprises at least two elongated side walls, a first elongated side wall on one broad side of the tool carrier, a second elongated side wall on the opposite broad side, said first and second side walls being essentially parallel with each other, the front part of one of the side walls is provided with a bearing hole intended to carry one of a sliding contact bearing or a rolling contact bearing, and the two side walls connected to each other at a plurality of sites, and each side wall has a length adapted to essentially cover at least the gap between the machine body and the perimeter of its associated disc shaped tool, so that each broad side of the side walls and the associated disc shaped tool together cover the power transmission, and at least two blade guards wherein at least one of the at least two blade guards is coupled to at least one of the side walls.

41. A machine according to claim 40, wherein the second sidewall is provided with a bearing hole and is on one side provided with the first side wall having a second major hole and is on the other side provided with a front local side wall having a third major hole, and the first major hole, the second major hole, and the third major hole being located outside of the bearing.

42. A machine according to claim 41, wherein the material of the side wall having the bearing hole is one of aluminum, iron steel, or a composite material.

43. The machine as recited in claim 40, wherein the at least one blade guard is coupled to the at least one side wall between the bearing hole and the machine body.

* * * * *